US008828279B1

(12) United States Patent
Zamkov et al.

(10) Patent No.: US 8,828,279 B1
(45) Date of Patent: Sep. 9, 2014

(54) COLLOIDS OF LEAD CHALCOGENIDE TITANIUM DIOXIDE AND THEIR SYNTHESIS

(75) Inventors: Mikhail Zamkov, Bowling Green, OH (US); Krishna P. Acharya, Bowling Green, OH (US)

(73) Assignee: Bowling Green State University, Bowling Green, OH (US)

( * ) Notice: Subject to any disclaimer, the term of this patent is extended or adjusted under 35 U.S.C. 154(b) by 410 days.

(21) Appl. No.: 13/082,620

(22) Filed: Apr. 8, 2011

Related U.S. Application Data

(60) Provisional application No. 61/342,301, filed on Apr. 12, 2010.

(51) Int. Cl.
*H01B 1/06* (2006.01)

(52) U.S. Cl.
USPC ........................................................ 252/519.4

(58) Field of Classification Search
USPC ................. 252/519.12, 519.14, 519.4, 520.2
See application file for complete search history.

(56) References Cited

U.S. PATENT DOCUMENTS

| | | | |
|---|---|---|---|
| 4,126,732 A | 11/1978 | Schoolar et al. | |
| 4,227,948 A | 10/1980 | Jensen et al. | |
| 4,263,604 A | 4/1981 | Jensen et al. | |
| 4,282,045 A | 8/1981 | Jensen et al. | |
| 4,371,232 A | 2/1983 | Jensen et al. | |
| 4,413,343 A | 11/1983 | Fukuda et al. | |
| 4,442,446 A | 4/1984 | Bouley et al. | |
| 4,477,730 A | 10/1984 | Fukuda et al. | |
| 4,608,694 A | 8/1986 | Partin | |
| 4,709,252 A | 11/1987 | Jhabvala et al. | |
| 4,743,949 A | 5/1988 | Zogg | |
| 4,943,971 A | 7/1990 | Fiet et al. | |
| 5,028,563 A | 7/1991 | Feit et al. | |
| 2005/0120946 A1 | 6/2005 | Hines et al. | |
| 2006/0110313 A1 | 5/2006 | Cho et al. | |
| 2007/0090336 A1 | 4/2007 | Asano et al. | |
| 2007/0186846 A1* | 8/2007 | Yong et al. ...................... 117/41 |
| 2008/0057311 A1 | 3/2008 | Hollingsworth et al. | |
| 2008/0224121 A1 | 9/2008 | Bose et al. | |
| 2008/0296534 A1 | 12/2008 | Lifshitz et al. | |
| 2009/0162278 A1 | 6/2009 | Ravn et al. | |
| 2009/0178700 A1 | 7/2009 | Heremans et al. | |
| 2009/0251759 A1 | 10/2009 | Domash et al. | |
| 2009/0293928 A1 | 12/2009 | Liang et al. | |

* cited by examiner

*Primary Examiner* — Mark Kopec
*Assistant Examiner* — William Young
(74) *Attorney, Agent, or Firm* — Marshall & Melhorn, LLC

(57) ABSTRACT

The invention comprises the method of growing lead chalcogenide nanocrystals from the surface of titanium dioxide in organic solvents, lead chalcogenide/$TiO_2$ nanocomposites colloids produced by the claimed method, and the application of lead chalcogenide/$TiO_2$ nanostructures as an active absorbing element in nanocrystal-sensitized solar cells.

6 Claims, 11 Drawing Sheets

US 8,828,279 B1

COLLOIDS OF LEAD CHALCOGENIDE TITANIUM DIOXIDE AND THEIR SYNTHESIS

RELATED APPLICATION DATA

This application claims the priority benefit of U.S. Provisional Application Ser. No. 61/342,301, filed Apr. 12, 2010, which is hereby incorporated in its entirety herein by reference.

STATEMENT OF GOVERNMENT INTEREST

None.

TECHNICAL FIELD OF THE INVENTION

The present invention is in the field of herbicides and related herbicidal and antifouling compositions, articles and methods.

BACKGROUND AND SUMMARY OF THE INVENTION

The present invention holds forth improvements in the field of nanotechnology, particularly as relates to the production of the method of growing lead chalcogenide nanocrystals from the surface of titanium dioxide in organic solvents.

Titanium dioxide is an important photovoltaic and photocatalytic material[1], which utilization in dye-sensitized solar cells[2], and hydrogen production[3] is encouraged by its low fabrication costs and minimal environmental hazards. Efficient harvesting of solar radiation within $TiO_2$ generally requires extending its absorption range into the visible and near infrared by introducing an appropriate sensitizer that engages in electron-transfer reaction with an oxide material upon receiving a photon of light. To date, the most common strategy for the sensitization of $TiO_2$ involves modification of its surface with organic-based transition metal complexes, such as porphyrins[4] or Ru-complexes[2]. On the other hand, incorporation of semiconductor nanocrystals (NC) as sensitizers is now being actively explored[5-20] due to a number of advantages offered by inorganic NCs, including wider absorption profile, superior resistance to photobleaching and continuous tunability of NC conduction levels.

As shown by recent reports, successful modification of anatase $TiO_2$ or amorphous $TiO_x$ with colloidal CdSe, InAs[21], PbSe[22], and PbS[23] NCs can be achieved in a reproducible manner leading to heterostructures that exhibit photoinduced charge separation. In these works, however, deposition of colloidal nanocrystals onto the oxide material still relies on organic linkers or non-epitaxial contacts with NC ligands, which makes it difficult to extract photoinduced carriers from NC domains leading to the decrease in electron transfer rates and carrier trapping at hybrid interfaces. For instance, surprisingly slow photo-induced electron transfer has been reported in organically coupled PbS—$TiO_2$ systems. To avoid these problems, several groups have attempted in situ growth of $CdS^{24,25,26}$ NCs onto mesoporous $TiO_2$ films in ionic solutions. While the observation of the 2-3 fold increase in the solar conversion efficiency of such films was encouraging, the quality and size-distribution of NCs fabricated using this approach was inferior to those synthesized through colloidal techniques, making it difficult to control relative positions of electron energy levels in a donor-acceptor system.

The present invention provides a colloidal route to the synthesis of PbSe/$TiO_2$ hetero-nanocrystals (HNCs), comprising 2-5 nm PbSe NCs grown directly on the surface of $TiO_2$ nanorods (NRs). As a main benefit of colloidal injection techniques, the present approach allows for a controlled adjustment of the sensitizer electronic levels via tuning the average NC diameter during synthesis, which is critical for the experimental realization of a desired type II (staggered) offset of donor and acceptor conduction band edges. Moreover, formation of a near-epitaxial interface between PbSe and $TiO_2$ domains enables a rapid injection of photoinduced carriers into the oxide material, which was demonstrated via a 50-fold increase in the photoinduced electron transfer rate between PbSe and $TiO_2$ domains, as compared to organically linked lead chalcogenide-$TiO_2$ assemblies.

The present invention thus provides a colloidal synthesis of PbSe/$TiO_2$ heterostructures, comprising small-diameter PbSe nanocrystals epitaxially grown onto the surface of $TiO_2$ nanorods. The deposition of lead sulfide onto prefabricated $TiO_2$ nanocrystals proceeds via formation of a thin PbSe shell that subsequently breaks into sub-2-nm islands. Additional precursor injections are then used to increase the size of PbSe nanocrystals up to 5 nm. In the case of small-size PbSe, a 2.1-ns transfer of photoinduced carriers into $TiO_2$ domain was evidenced through quenching of the PbSe band-gap emission. Overall, present synthesis demonstrates a colloidal approach to all-inorganic modification of $TiO_2$ surfaces with semiconductor nanocrystals, which provides a viable alternative to a more common supramolecular assembly of nanocrystal-oxide composites.

In addition, semiconductor nanocrystals (NCs) are considered to be a promising class of materials for the development of new-generation solar cells due to the superior optoelectronic properties of inorganic semiconductors and the stability of as-prepared nanocrystals in colloidal suspensions, which allows for inexpensive, solution-based device fabrication. The demonstrated potential of these materials for the enhanced absorption of solar light and efficient spatial separation of photoinduced carriers have given rise to several photovoltaic architectures, including hybrid bulk heterojunction, all-inorganic, and nanocrystal-sensitized solar cells. For instance, spincoated films of semiconductor NCs can be introduced as light-absorbing layers and simultaneously as n-type components in nanocrystal/polymer bulk heterojunction solar cells, or, alternatively, incorporated into an all-inorganic bi-layer design comprising a heterojunction of n- and p-type NC films. The use of semiconductor NCs in third-generation light-harvesting applications has greatly improved the device resistance against oxidation and photodegradation, but, so far, has not yet resulted in desired power conversion efficiencies. In particular, the main weakness of photovoltaic architectures that rely on colloidal NCs remains to be a rather poor carrier collection at the working electrode, which is caused by inefficient intra-particle conductance of photogenerated charges through a three-dimensional matrix of organically coated nanocrystals.[27-32]

The problem of poor carrier collection in NC-based solar cells can be avoided if colloidal NCs are excluded from the process of carrier transport, and participate primarily as inorganic light-absorbing elements. This type of light-harvesting mechanism has been successfully implemented in the past through a dye-sensitized solar cell design[2], where semiconductor NCs were employed as light sensitizers in lieu of organic dyes. The transport of photogenerated electrons towards a working electrode, in this case, is mediated via mesoporous $TiO_2$, while photoinduced holes are regenerated by means of a liquid[33,34,35] or solid[36,37] electrolyte. From the long-term prospective, the attempted replacement of organic sensitizers with inorganic semiconductor NCs in dye-sensitized solar cells constitutes a natural step towards increasing the intake of solar energy and improving the system's long-term stability against photodegradation, but may require further development of the donor-acceptor architecture, as was highlighted by a number of recent investigations[38-51].

At present, there are two main schemes for incorporating NC sensitizers onto the surface of $TiO_2$, which include (i)—introducing organic linker-molecules that bridge colloidal NCs with $TiO_2$, and (ii)—growing NCs directly onto the oxide surface via chemical bath deposition (CBD) or successive ionic layer adsorption and reaction (SILAR) process[52]. The former approach has been successfully employed to couple $CdS^{53}$, $CdSe^{45,54,55}$, InAs, $PbSe^{56}$ and $PbS^{57}$ NCs onto $TiO_2$ via 3-mercaptopropionic acid (MPA) or through a non-epitaxial contact to organic ligands and, thus far, has yielded up to 1.7% of power conversion efficiency (PCE). The main drawback of this method is considered to be the presence of supramolecular organic spacers between nanocrystal and oxide domains, which augment the tunneling barrier between excited states of a sensitizer and the conduction band of $TiO_2$, causing a decrease in electron transfer probability. In addition, a number of experimental works have demonstrated that organic linkers can also serve as carrier traps, which further reduce the electron transfer rate. These drawbacks, associated mainly with the presence of organic linkers in the NC-$TiO_2$ assembly, are successfully avoided in the second deposition method, where NCs are grown directly onto the $TiO_2$ via chemical bath deposition $CBD^{18,40,41,50,58,59,60}$, leading to all-inorganic NC/$TiO_2$ heterostructures. Indeed, recent studies have shown that CBD-grown NC/oxides films show an improved carrier injection and superior PCE and Incident Photon to Current Efficiency (IPCE) values[61]. The quality and the size distribution of CBD grown NC sensitizers, however, remain inferior to those synthesized through colloidal techniques[62]. Furthermore, the aqueous route to growing of NC sensitizers through CBD approach is often ineffective with air-sensitive semiconductors, such as PbSe or PbS, revealed by an overall low crystallinity and poor optical properties.

The present invention provides a relatively facile method for developing PbS-sensitized $TiO_2$ films, which combines the benefits of the hot-injection colloidal route to the synthesis of monodisperse PbS NC sensitizers, with the advantages of linker-free, all-inorganic, PbS/$TiO_2$ heterojunction. In the present approach, the processes of sensitizer deposition and sintering of the film are performed in the reverse chronological order, which allows for a hot-temperature growth of the PbS sensitizer directly onto the surface of $TiO_2$, followed by a solution-phase deposition of PbS-modified $TiO_2$ nanoparticles onto a conductive substrate. The resulting PbS/$TiO_2$ films are then subjected to high-temperature annealing process to remove residual surface ligands, whereby yielding an all-inorganic absorbing layer. In view of the renewed interest in NC-sensitized solar cells, which revival is fueled by the on-going research and discovery of non-corrosive[36,63,64], and longer-lasting[35] hole-scavenging materials, the PbS/$TiO_2$ heterostructured films, reported here, could potentially lead to high-efficiency NC-sensitized solar cells.

Recently, colloidal growth of hetero-epitaxial semiconductor/$TiO_2$ composites via hot-injection routes has been demonstrated by several groups.[65,66] Acharya et. al.[66] has reported the synthesis of PbSe/$TiO_2$ nanostructures, comprising epitaxial assemblies of PbSe NCs and $TiO_2$ nanorods, where the average size of NC sensitizer could be tuned from 2 to 5 nm. Unfortunately, a relatively low position of the conduction band edge in PbSe NCs, prevented the desirable combination of a narrow-band-gap PbS sensitizer and proper alignment of PbSe and $TiO_2$ excited state levels needed for an efficient electron transfer. In contrast to PbSe/$TiO_2$ heterostructures, the PbS/$TiO_2$ combination of materials, explored in accordance with the present invention, supports the PbS to $TiO_2$ electron transfer even for large diameter PbS NCs[57] (d≤7 nm), which allows obtaining a near-optimum band gap for the solar energy conversion ($\hbar\omega \approx 1.4$ eV). The present invention provides a controllable tuning of PbS domain sizes in the 2-15 nm range with an average dispersion of PbS diameters between 9% and 14%. Owing to a sequential two-step approach to the synthesis of $TiO_2$/PbS NCs, the size and the shape of $TiO_2$ domains can be tuned as well, which provides an additional degree of freedom for optimizing the transport of photoinduced carriers through an array of $TiO_2$/PbS nanoparticles.

In accordance with the preferred embodiment of the present invention, following purification, colloidal suspensions of synthesized PbS/$TiO_2$ NCs may be used to fabricate ethanol-based pastes for the development of thin films on top of a conductive transparent electrode. After annealing, these films were incorporated into a standard two-electrode cell filled with polysulfide electrolyte for electrochemical characterization. The measured photoaction spectra were found to compare favorably with those of PbS-sensitized $TiO_2$ films fabricated via conventional chemical bath deposition route.

The invention comprises the method of growing lead chalcogenide nanocrystals from the surface of titanium dioxide in organic solvents, lead chalcogenide/$TiO_2$ nanocomposites colloids produced by the claimed method, and the application of lead chalcogenide/$TiO_2$ nanostructures as an active absorbing element in nanocrystal-sensitized solar cells.

The present invention includes compositions of matter and methods of their synthesis, the compositions including a new class of nanocomposite colloids.

The method of the present invention may be understood as a method of preparing a lead chalcogenide/$TiO_2$ nanocomposite colloid, the method comprising injecting the lead and chalcogenide precursors of the lead chalcogenide/$TiO_2$ nanocomposite colloid into a heated mixture of: (a) organically passivated $TiO_2$ nanoparticles; and (b) at least two surfactants capable of promoting the growth of lead chalcogenide nanocrystals directly onto the surface of the $TiO_2$ nanoparticles, the at least two surfactants being present in a ratio that may be changed, whereby the shape of the nanocrystals formed in the mixture of surfactants is capable of being controlled by adjusting the ratio of the lead chalcogenide surfactants in the binary mixture.

It is preferred that the mixture comprises lead chalcogenide domains selected from the group consisting of PbS, PbSe, PbTe, PbSxSe1−x nanocrystals, and mixtures thereof.

The $TiO_2$ nanoparticles may have shapes selected from the group consisting of nanorods, tetrapods, and spheres, and mixtures thereof. Preferably, the $TiO_2$ nanoparticles have shapes selected from the group consisting of nanorods, tetrapods, spheres, and mixtures thereof, wherein the smallest dimension size thereof is in the range of from about 2 to about 10 nm, and wherein the largest dimension size thereof is in the range of from about 5 to about 100 nm. The surfactants that may be used in the present invention may include any appropriate surfactant consistent with the formation of colloids of the type of the present invention, such as those selected from the group consisting of acids, amines, alkanes, and mixtures thereof.

The present invention also includes a lead chalcogenide/$TiO_2$ nanocomposite fabricated by the process according to present invention. It is preferred that the lead chalcogenide/ $TiO_2$ nanocomposite is soluble in at least one organic nonpolar solvent.

It is also preferred that the lead chalcogenide/$TiO_2$ nanocomposite has lead chalcogenide domain sizes in the range of from about 1.5 to about 10 nm. It is further preferred that the lead chalcogenide/$TiO_2$ nanocomposites comprise multiple lead chalcogenide domains adjacent to a single $TiO_2$ nanoparticle host. Also preferred is that the lead chalcogenide/ $TiO_2$ nanocomposite having $TiO_2$ domains having shapes selected from the group consisting of nanorods, tetrapods, and spheres, and mixtures thereof, and having a smallest dimension in the range of from about 2 to about 10 nm, and a largest dimension in the range of from about 5 to about 100 nm.

The method of the present invention also includes a method of preparing a lead chalcogenide/$TiO_2$ nanocomposite colloid, the method comprising: (a) injecting the lead and chalcogenide precursors of said lead chalcogenide/$TiO_2$ nanocomposite colloid into a first heated mixture of: (1) organically passivated $TiO_2$ nanoparticles; and (2) at least two surfactants present in the reaction mixture during lead chalcogenide deposition step capable of promoting the growth of lead chalcogenide nanocrystals directly onto the surface of said $TiO_2$ nanoparticles, said at least two lead chalcogenide surfactants being present in a first ratio; and (3) allowing lead chalcogenide nanocrystals directly onto the surface of said $TiO_2$ from said first heated mixture; and (b) preparing a second heated mixture of: (1) organically passivated $TiO_2$ nanoparticles; and (2) at least two surfactants present in the reaction mixture during lead chalcogenide deposition step capable of promoting the growth of lead chalcogenide nanocrystals directly onto the surface of said $TiO_2$ nanoparticles, said at least two lead chalcogenide surfactants being present in a second ratio, (3) allowing lead chalcogenide nanocrystals directly onto the surface of said $TiO_2$ from said second heated mixture, whereby the shape of said nanocrystals formed in said second mixture is different than the shape of said nanocrystals formed in said first mixture.

The method of the present invention also includes a method of a method of preparing lead chalcogenide nanocrystals of a desired shape from a lead chalcogenide/$TiO_2$ nanocomposite colloid, the method comprising injecting the lead and chalcogenide precursors of said lead chalcogenide/$TiO_2$ nanocomposite colloid into a heated mixture of: (a) determining the desire shape of lead chalcogenide nanocrystals to be prepared; and (b) injecting the lead and chalcogenide precursors of said lead chalcogenide/$TiO_2$ nanocomposite colloid into a heated mixture of: (1) organically passivated $TiO_2$ nanoparticles; and (2) at least two surfactants present in the reaction mixture during lead chalcogenide deposition step capable of promoting the growth of lead chalcogenide nanocrystals directly onto the surface of said $TiO_2$ nanoparticles, said at least two lead chalcogenide surfactants being present in a ratio selected to said nanocrystals to be formed in said desired shape; and (c) allowing lead chalcogenide nanocrystals directly onto the surface of said $TiO_2$ from said heated mixture.

The present invention also includes a nanocrystal-sensitized solar cell having a conductive transparent electrode, and comprising lead chalcogenide/$TiO_2$ nanocomposites such as those produced by the method of the present invention, wherein the nanocomposites act as an active absorbing element and are deposited in form of a paste onto the conductive transparent electrode. The present invention also includes a method of gathering solar energy using the nanocomposites of the present invention.

The present invention also includes a method of gathering solar energy using the nanocomposites of the present invention.

The present invention also includes a method of producing hydrogen using the nanocomposites of the present invention.

In another variation of the present invention, the present invention provides hetero-epitaxial growth of nearly monodisperse PbS nanocrystals onto the surface of $TiO_2$ nanoparticles via colloidal hot-injection routes (i.e., routes in excess of 100 degrees C.; typically about 180 C). Fabricated PbS/ $TiO_2$ nano-composites can be dispersed in non-polar solvents, which enables an easy solution processing of these materials into mesoporous films for use as light-absorbing layers in nanocrystal-sensitized solar cells. High-temperature deposition of the sensitizer material allows controlling both the size and the number of PbS domains that are grown onto $TiO_2$ nanoparticles, whereby providing synthetic means for tuning the spectral sensitivity of PbS/$TiO_2$ nano-composites and simultaneously enhancing their photocatalytic response in the visible and near-infrared. Compared to conventional ionic bath deposition of PbS semiconductors onto $TiO_2$, the results obtained in accordance with the method of the present invention show an improved nanocrystal quality and narrower distribution of PbS sizes, thus allowing for precise tuning of excited state energies in a PbS—$TiO_2$ donor-acceptor system, meanwhile, the use of hot-temperature deposition of PbS (T=180° C.) promotes the formation of epitaxial relationships between PbS and $TiO_2$ domains, leading to fewer interfacial defects. The photovoltaic response of pyridine-treated PbS/$TiO_2$ nano-composites was measured in a two-electrode configuration using polysulfide electrolyte. The measured photoresponse compares favorably to that of PbS-modified $TiO_2$ electrodes fabricated via chemical bath deposition.

The characteristics and uses of lead chalcogenide are also described for instance in U.S. Published Patent Applications Nos. 20090293928, 20090251759, 20090178700, 20090162278, 20080296534, 20080224121, 20080057311, 20070090336, 20060110313, and 20050120946, as well as in U.S. Pat. Nos. 5,028,563, 4,943,971, 4,743,949, 4,709,252, 4,608,694, 4,477,730, 4,442,446, 4,413,343, 4,371,232, 4,282,045, 4,263,604, 4,227,948, and 4,126,732, all of which are incorporated herein by reference. These use and devices may be considered to be part of the present invention to the extent lead chalcogenide produced in accordance with the present invention may be applied to such uses, devices and methods.

The present invention also includes

BRIEF DESCRIPTION OF THE DRAWINGS

FIG. 1(*b*) is a schematic representation of the Volmer-Weber regime of heteroepitaxial growth, where the energy of PbSe/$TiO_2$ interface is reduced through the formation of island-like features.

FIG. 2 (*b-e*) are TEM images of PbSe/$TiO_2$ HNCs that form after the initial (b,c) and secondary (d, e) injections of Pb and Se precursors.

FIG. 3(b) shows a high-resolution TEM image of the PbSe/TiO$_2$ interface, showing quasi-matching of crystal lattices along 110 and 010 faces of PbSe and TiO$_2$, respectively.

DETAILED DESCRIPTION OF THE PREFERRED EMBODIMENTS

Figure 1:
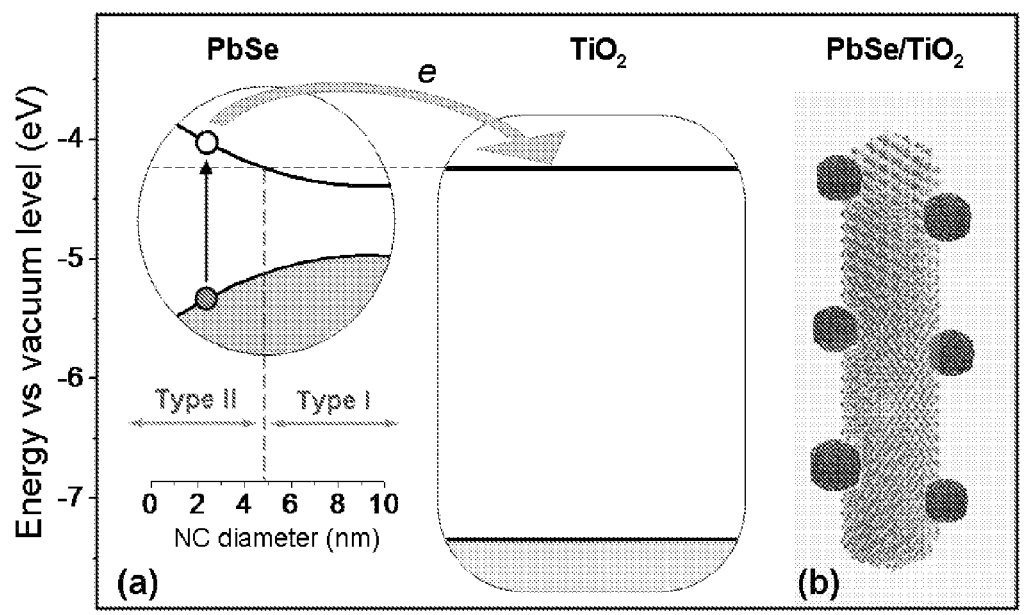
FIG. 1(*a*) is a schematic representation of the size-dependent energies of 1S(e) electronic levels for PbSe NCs and $TiO_2$ nanorods. Photoinduced electron transfer from PbSe to $TiO_2$ is energetically allowed if PbSe diameter is less than 5 nm.

In accordance with the foregoing summary, the following represents a description of the preferred embodiments of the present invention, which are presently considered to be the best mode.

The preferred embodiment involves the following materials and methods:

Chemicals 1-octadecene (ODE, 90% Aldrich), oley amine (OLAM, 70% Aldrich), oleic acid (OA, 90% Aldrich) titanium tetrachloride (TiCl4, 99.9% Aldrich), lead (II) oxide powder (PbO, 99.999% Aldrich), selenium powder (Se, 99.5% Acros), Sulfur (99.999%, Acros), 1-octadecene (ODE, tech., 90%, Aldrich), tri-n-octylphosphine oxide (TOPO, 99%, Aldrich), selenium (99.5+%, Acros), hexane (anhydrous, 95%, Aldrich), methanol (anhydrous, EMD), toluene (anhydrous, 99.8%, Aldrich), chloroform (anhydrous, 99+%, Aldrich). All chemicals were used as received without any further purification. All reactions were performed under argon atmosphere using the standard Schlenk technique.

Preparation of Injection Precursors

The lead precursor was prepared by dissolving 0.45 g (2.0 mmol) of lead oxide in a mixture of 1.6 g of OA and 4 g of ODE by heating the flask to 200° C. for 30 minutes. Prior to the injection the temperature of the Pb solution was lowered to 140° C. 1 M TOP-Se solution was prepared by dissolving 0.21 g of Se in 2.7 ml of TOP at room temperature and heated up to 100° C. prior to injection. Two different approached were used to prepare a sulfur stock solution (see supporting information for PbS/TiO$_2$ heterostructures). As a low-reactive precursor, 0.04 g of sulfur was combined with 3 ml of ODE and subsequently heated up to 200° C. to form a clear solution. Prior to the injection, the mixture was cooled down to the room temperature. As a more reactive source of sulfur, 0.3 ml of hexamethyldisilthiane was combined with 3 ml of degassed ODE at room temperature.

Synthesis of PbSe/TiO$_2$ Heterostructures

A one-pot synthesis of PbSe/TiO$_2$ proceeded via the initial growth of TiO$_2$ nanorods onto which PbSe NCs were subsequently grown by injecting lead selenide precursors at lower temperature. Typically, 6.5 mmol of OLAM, and 1 mmol of OLAC were mixed in a three-neck flask and degassed using mechanical vacuum pump at 120° C. for 30 min minutes. The mixture was subsequently switched to argon and 1 mmol of TiCl4 was injected into the flask at 40° C. The reaction flask was then heated up to 300° C. and kept at that temperature for 30 minutes. To initiate the growth of PbSe NCs the temperature of the reaction mixture was lowered to 190° C. and warm precursors of Pb (T=100° C.) and Se (T=80° C.) were injected simultaneously. Typically 3-5 ml of lead and 1.3-3 ml of Se stock solutions were used during the first injection. The subsequent injection(s) were made 4 min after the first (or previous). Grown nanostructures were purified using several toluene/ethanol extractions.

Characterization

UV-vis absorption and photoluminescence spectra were recorded using CARY 50 Scan spectrophotometer and Jobin Yvon Fluorolog FL3-11 fluorescence spectrophotometer. High resolution transmission electron microscopy measurements were carried out using JEOL 3011 UHR operated at 300 kV. Specimens were prepared by depositing a drop of nanocrystal hexane solution onto a formvar-coated copper grid and letting it dry in air. X-ray powder diffraction measurements were carried out on Scintag XDS-2000 X-Ray Powder Diffractometer. Energy Dispersive X-ray (EDX) emission spectra were measured using an EDAX X-ray detector located inside a scanning electron microscope. The electron beam was accelerated at 20 kV.

Fluorescence Lifetime Measurements

FL lifetime measurements were performed using a time correlated single photon counting setup utilizing SPC-630 single photon counting PCI card (Becker& Hickle CmbH), picosecond diode laser operating at 400 nm, as an excitation source (Picoquant), and id50 avalanche photodiode (Quantique). The repletion rate of the laser was chosen to allow for a 1000 ns time window, while the pulse fluence was adjusted to produce about 1 emission photon per 100 excitation pulses (excitation power was 100 μW).

Results and Discussion

In the case of colloidal heterostructures, the type of inorganic interface that forms at the boundary of the two material domains is determined by the relationship between the total surface energy of the composite nanoparticle and the solid-solid interfacial energy related to the mismatch-induced strain between the two lattices. If the interfacial strain exceeds the surface tension of either material, such structure may undergo a spatial rearrangement that eliminates some of the interfacial region by increasing the overall surface area[67]. This scenario is clearly observed for PbSe/TiO$_2$ heterostructures, where a large lattice mismatch of either 6.7% or 18% corresponding to merging of 010 and 110 (FIG. 3b) or 001 and 100 faces of anatase TiO$_2$ and rock-salt PbSe crystal lattices, leads to the Volmer-Weber growth of the PbSe material, characterized by the formation of small PbSe islands throughout the surface of TiO$_2$ (FIG. 1b). One potential benefit associated with such growth mode is the possibility of increasing the optical extinction coefficient of these nanoparticles by sintering several PbSe sensitizes per single TiO$_2$ NR. Since the light absorption cross section of 2-nm PbSe NCs, is generally small ($\approx 2 \times 10^{-15}$ cm$^2$, $\lambda=400$)[68], the maximum number of electron-hole pairs generated in a single PbSe/TiO$_2$ structure, under ambient illumination (photon flux$\approx 3 \times 10^{21}$ m$^{-2}$s) is less than one, which is not expected to produce non-linear charging effects[69]. As a result, increasing the number of PbSe sites in PbSe/TiO$_2$ heterostructures should result in a linear increase of the power conversion efficiency in NC-sensitized solar cells. Another benefit of the Volmer-Weber growth regime is the thermodynamically-stable formation of small-diameter PbSe NCs, which is critical for the realization of a type II heterojunction between PbSe and TiO$_2$ materials. Indeed, according to the energy diagram of electronic states in PbSe NCs (FIG. 1a), calculated from electron injection studies[70,71] and empirical scaling of band edge absorption, the transfer of photoinduced electrons from PbSe to TiO$_2$ is energetically permissible only if the size of PbSe is less than 5 nm.

Figure 2:
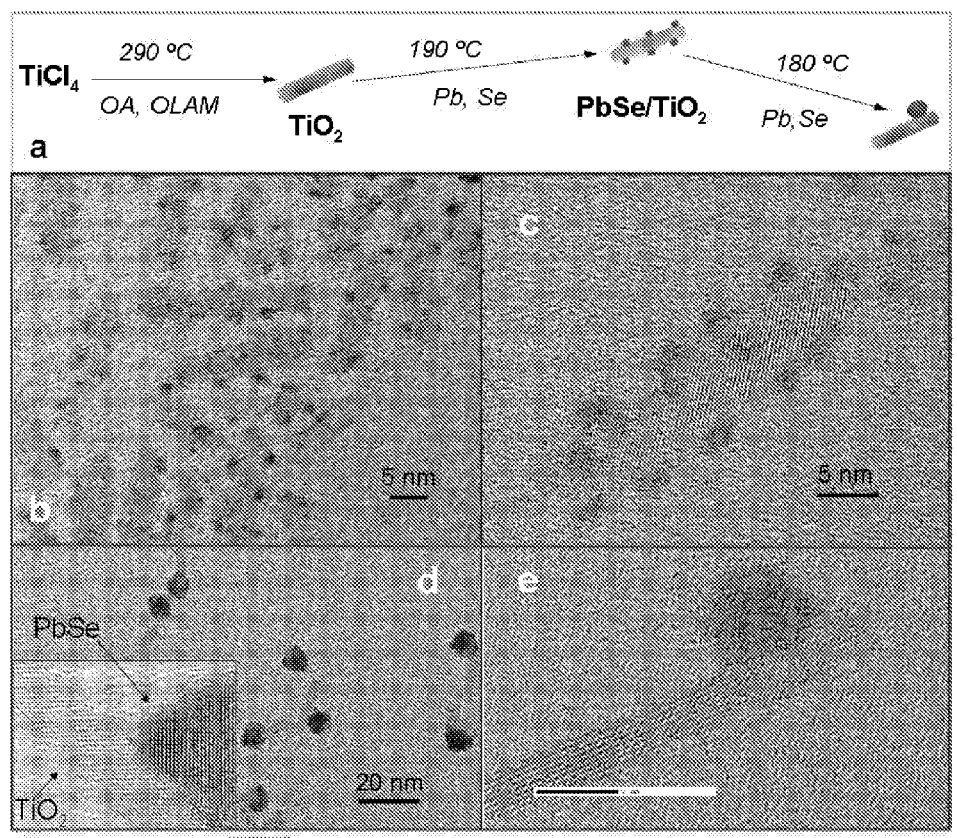
FIG. 2(*a*) is a schematic representation of the PbSe/$TiO_2$ synthesis.
Figure 3:
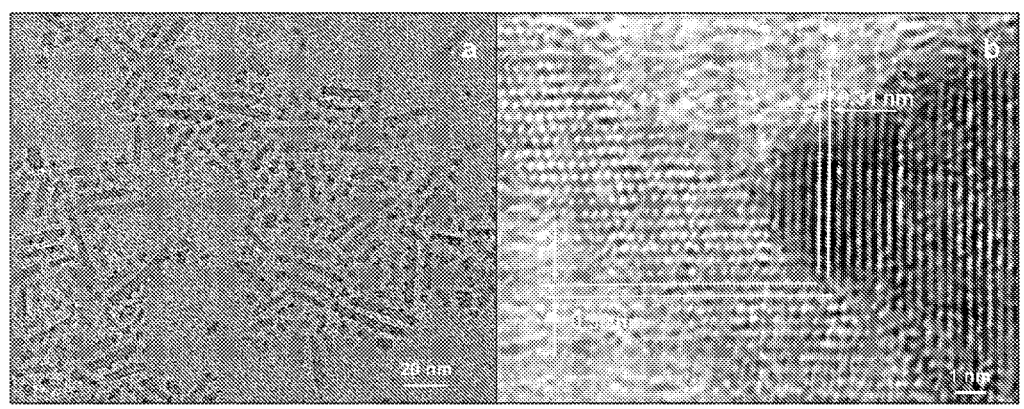
FIG. 3(*a*) shows a low-magnification TEM image of PbSe/ $TiO_2$ HNCs.

Schematics of the one-pot approach to the synthesis of PbSe/TiO$_2$ HNCs are illustrated in FIG. 2a. Growth of TiO$_2$ NRs was performed according to a method adapted from reference 32.[72] by heating TiCl$_4$ to 300° C. in a presence of oleic acid (OA) and oleylamine (OLAM). This approach makes use of high concentration of Ti precursor in the reaction mixture to yield high-aspect ratio anatase nanorods elongated along the <001> crystallographic direction. Upon formation of TiO$_2$ NRs, the temperature of the reaction mixture was lowered to 180° C. for the growth of PbSe NCs. Typically, a single injection of Pb and Se precursors lead to the formation of 2-3 nm PbSe islands on the surface of nanorods. A small amount of isolated PbSe NCs (<10% of nanoparticles) was also observed in as-prepared reaction mixture and was subsequently reduced to less than 2% after the purification stage (FIG. 3a). Additional injections of precursors were needed to fuel the growth of PbSe islands beyond 3 nm in size.

Transmission electron microscopy (TEM) analysis of PbSe/TiO$_2$ HNCs reveals a qualitative difference between the shapes of PbSe NCs forming on the surface of TiO$_2$ NRs as a result of a single and multiple injections of Pb and Se precursors. The initial injection leads to the formation of several small-diameter PbSe sites per single NR (FIGS. 2b, 2c), with an average site diameter of 1.8-3.0 nm and size dispersion of 10-14%. The number of PbSe NCs per single TiO$_2$ NR is estimated to be 21±6, where the dispersion in the number of dots is mainly determined by the dispersion of NR surface areas.

Doubling the concentration of precursors for the first injection was found to produce a 10-15% increase in the density of PbSe dots on the surface of TiO$_2$, but did not affect an average dot size. According to a high resolution TEM image of a typical PbSe/TiO$_2$ HNC in FIG. 2c, PbSe dots appear to be uniformly scattered over the entire NR surface and exhibit a moderate dispersion of sizes. A near-symmetric placement of PbSe dots on the surface of TiO$_2$ can be explained in terms of fundamental energy requirements on the deposition of secondary material in hetero-epitaxial growth. Namely, spatially isotropic addition of PbSe monomers onto TiO$_2$ NRs initially results in the formation of a thin PbSe shell. Subsequent lateral expansion of the shell is associated with the mismatch-induced increase of the interfacial energy, which promotes the collapse of the PbSe layer into segregated islands.

Secondary injections of precursors were used to induce the growth of larger PbSe NCs on TiO$_2$ surfaces, (FIGS. 2d, 2e). The amount of PbSe sites per single NR in this case is reduced to one (FIG. 2e) or two, which indicates that some of the smaller islands can coalesce into bigger nanoparticles, as evident in the transitional heterostructure. Such transformation is thermodynamically favorable since the combined surface area of PbSe NCs is reduced during aggregation, causing the reduction in the total surface energy of the heterostructure. A high resolution TEM image of a PbSe/TiO$_2$ HNC comprising a single 5-nm PbSe NC (FIG. 2e), confirms that the surface of a NR is virtually free of small PbSe sites, which supports the coalescence-induced formation of large PbSe NCs. For these structures the volume of the PbSe crystal phase is approximately equal to that of TiO$_2$, as can be deduced form near-equal amplitudes of elemental peaks in energy dispersive x-ray (EDX) spectra (FIG. 4d).

Figure 4:
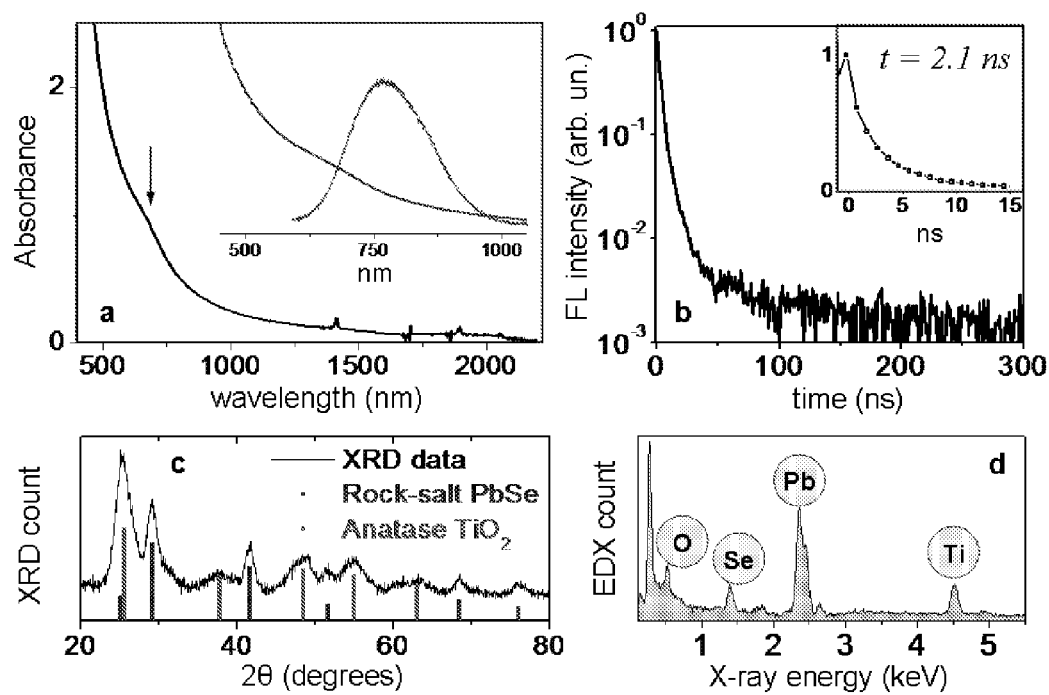
FIGS. 4(a) and 4(b) show, respectively an absorption and emission spectra (a) and FL lifetime measurements (b) of PbSe/TiO$_2$ HNCs, comprising 1.9-nm PbSe NCs. X-ray powder diffraction (c) and EDX (d) spectra of PbSe/TiO$_2$ HNCs comprising 4.8-nm PbSe NCs.

Optical properties of PbSe/TiO$_2$ HNCs incorporating 1.9-nm PbSe NCs are analyzed in FIG. 4. The absorption profile of PbSe/TiO$_2$ is characteristic of type II heterostructures with non-zero photon absorption in the spectral range below the band gap of both PbSe and TiO$_2$ materials. This is expected due to excitations of intermediate states that exist at the junction of both materials[73]. The highest in energy excitonic feature, corresponding to the band edge absorption in PbSe NCs can also be identified near 700 nm. Its spectral position correlates well[74] with an estimated from TEM average PbSe size of 1.9 nm.

As-prepared PbSe/TiO$_2$ HNCs, comprising small-diameter PbSe NCs show a weak emission feature (emission quantum yield <0.5%) in the 650-900 nm range, as shown in FIG. 4a. Both the position and the width of the FL peak are consistent with the expected 1S(e)-1S(h) recombination of carriers in 1.9-nm PbSe NCs, implicating the band-edge origin of the emission. Surprisingly, the contribution of trap states into the FL signal, expected due to a large surface area of PbSe NCs and the possible formation of electron-trapping defects along the strained interface of PbSe and TiO$_2$ domains, was not significant, as evident by the lack of emission originating from below PbSe band gap.

The dynamics of carrier decay was further investigated using FL lifetime measurements (FIG. 4b). The observed emission lifetime of 2.1 ns is substantially shorter then expected for 1S(e)1S(h) excitons in PbSe NCs, for which room-temperature values in excess of 500 ns were repartee. It should also be noted that for small-diameter PbSe NCs, FL lifetimes are expected to increase due to the inverse correlation of the radiative rate and NC band gap[76]. In general, there are two main factors that can potentially lead to such a dramatic decrease of FL lifetimes in PbSe/TiO$_2$ HNCs: electron trapping at defects and oxidation of PbSe NCs via carrier transfer to TiO$_2$. As mentioned above the signature of trap states emission was not observed in the FL spectra. Likewise, the FL relaxation trend is not typical of carrier traps that generally contribute a long-lived component with decay constants in excess of 1 µs. Therefore, the observed rapid quenching of FL is attributed to the transfer of photoinduced electrons from PbSe NCs to TiO$_2$ NRs. Based on the observed excited-state lifetime, one may conclude that characteristic timescale for photoinduced electron transfer is 2.1 ns, which is significantly faster than 100-ns electron transfer times observed for organically linked PbS—TiO$_2$ systems.

In summary, the present invention provides a solution-phase synthesis of PbSe/TiO$_2$ heterostructures, comprising small-diameter PbSe nanocrystals grown on the surface of TiO$_2$ nanorods. Fabricated materials exhibit an efficient conversion of visible light energy via a rapid transfer of photo-induced electrons into TiO$_2$ domains. From the general prospective, present synthesis demonstrates an all-inorganic modification of TiO$_2$ surfaces with semiconductor NCs, and could be extended to other nanocrystalline systems, as shown in the supporting information section for PbS-sensitized TiO$_2$ NRs. Moreover, the heteroepitaxial growth of lead chalcogenides is not limited to TiO$_2$ NRs and can be adapted to other nanostructured forms of TiO$_2$ including porous films and nanotubes, whereby introducing a colloidal route to sensitization of TiO$_2$ surfaces without organic-molecular bridging.

In addition, in accordance with the present invention one may control tuning of a PbS domain sizes in the 2-15 nm range with an average dispersion of PbS diameters between 9% and 14%. Owing to a sequential two-step approach to the synthesis of TiO$_2$/PbS NCs, the size and the shape of TiO$_2$ domains can be tuned as well, which provides an additional degree of freedom for optimizing the transport of photo-induced carriers through an array of TiO$_2$/PbS nanoparticles.

Following the purification step, colloidal suspensions of synthesized PbS/TiO$_2$ NCs were used to fabricate ethanol-based pastes for the development of thin films on top of a conductive transparent electrode. After annealing, these films were incorporated into a standard two-electrode cell filled with polysulfide electrolyte for electrochemical characterization. The measured photoaction spectra were found to compare favorably with those of PbS-sensitized TiO$_2$ films fabricated via conventional chemical bath deposition route.

The following presents another example of a synthesis in accordance with the present invention.

Materials

The following starting materials were obtained commercially: 1-octadecene (ODE, 90% Aldrich), oleylamine (OLAM, 70% Aldrich), oleic acid (OA, 90% Aldrich) titanium tetrachloride (TiCl4, 99.9% Aldrich), titanium (IV) iso-propoxide (99.999%, Aldrich), ethanol (anhydrous, 95% Aldrich), pyridene (anhydrous, 99.8% Aldrich), lead nitrate (99.99%, Aldrich.), lead (II) oxide powder (PbO, 99.999% Aldrich), chloroplatinic acid hydrate (99.9%, Aldrich), sodium sulfide nonanhydrate (98%, Alfa Aesar), sulfur (99.999%, Acros), 2-propanol (99.8%, Acros), ITO/glass (8-12, ohm/sq, Aldrich), Titanium dioxide (P25, Evonick Degussa). All chemicals and materials were used as received without any further purification. All reactions were performed under argon atmosphere using the standard Schlenk technique.

Preparation of Injection Precursors

The lead precursor was prepared by dissolving 0.8 g (3.5 mmol) of lead oxide in a mixture of 1.3 g of OA and 4 g of ODE via heating the flask to 200° C. for 30 minutes. Prior to the injection, the temperature of the Pb solution was lowered to 140° C. A sulfur solution was prepared by dissolving 0.10 g (3.1 mmol) of S in 2.4 g of ODE at 200° C. for 5 minutes. The solution was subsequently cooled down to the room temperature.

Synthesis of PbS/TiO2 Heterostructures

One-pot synthesis of PbS/TiO$_2$ nano-composites proceeded via the initial growth of TiO$_2$ nanorods, onto which PbS NCs were subsequently grown by injecting lead and sulfur precursors at lower temperatures. To fabricate TiO$_2$ nanorods, 2.85 g OLAM, and 0.28 g OLAC were mixed in a three-neck flask and degassed using mechanical vacuum pump at 120° C. for 30 minutes[72]. The mixture was subsequently switched to argon, and 0.05 mL (0.45 mmol) of TiCl$_4$ was injected into the flask at 40° C. The reaction mixture was then heated to 300° C. and kept at that temperature for 30 minutes. For the growth of 3-4 nm PbS NCs, the temperature of the reaction mixture was lowered to 180° C. and the full amount of both precursors Pb (at T=180° C.) and S (at room temperature) was simultaneously injected under vigorous stirring. The initial 40-50° C. drop in the temperature of the solution recovered to 180° C. within 2 min, while the solution color turned dark almost immediately after injection. The reaction was stopped after 2 min by removing the flask from the heating mantle, at which point 6 mL of degassed toluene were added. Cleaning of nanoparticles was performed by a repetitive precipitation in ethanol and a subsequent re-dissolution in toluene. For the last cleaning cycle, the precipitation was done using a mixture of ethanol and toluene (1:8 by volume) to remove any isolated nanocrystals in the mixture.

PbS/TiO$_2$ (Nano-Composite) and PbS/TiO$_2$ (P25-CBD) Working Electrode Preparation Prior to the development of nano-composite films, the bulky ligands on PbS/TiO$_2$ heterostructures were exchanged with shorter pyridine molecules. For this purpose, PbS/TiO$_2$ colloids were precipitated with ethanol, redispersed in 8 ml of pyridine and stirred at 60° C. overnight (15 hours). Pyridine-coated PbS/TiO$_2$ nano-composites were subsequently precipitated, mixed with a few drops of ethanol and sonicated for 50 minutes to a get homogeneous paste. A thin film was then spread onto ITO/glass substrate using a doctor blade method over the area of approximately 60 mm$^2$ (see the insert in FIG. 7b). The sintering was performed on a hot plate under Argon flow. To fabricate a working electrode using a chemical bath deposition method, 1.75 g of TiO$_2$ nanoparticles (Degussa, P25) was mixed with 7.5 mL ethanol and sonicated for 40 minutes. Subsequently, 0.25 mL of titanium tetraisopro-poxide was added, and the mixture was sonicated further to form a homogenous paste. After the deposition of TiO$_2$ (P25) film onto ITO covered glass it was sintered at 450° C. for 30 min to allow good electronic conduction.[77] In situ deposition of PbS on TiO$_2$ was carried out in the chemical bath of the precursor material through a successive ionic layer adsorption and reaction process.[36] For this purpose, TiO$_2$ working electrode film was immersed in 0.02 M methanol solution of Pb(NO$_3$)$_2$ for 1 minute, rinsed with methanol followed by immerging in 0.02 M methanol Na$_2$S solution for one minute, and rinsed again with methanol making one complete deposition cycle. This process was repeated six times, and was monitored by recording absorbance spectra at each step.

Assembly of PbS/TiO$_2$ Solar Cells and Photocurrent Measurements

Polysulfide electrolyte was made by combining 0.5 M Na$_2$S, 1.5 M sulfur, and 0.2M KCl in methanol and water (7:3).[78] Platinized ITO counter electrode was prepared by spreading few drops of 5 mM chloroplatinic acid in 2-propanol on the glass followed by heating to 400° C. for 1 hour. A parafilm spacer with a central opening was put on the top of the film and filled with a few drops of electrolyte. The assembly of the cell was completed by capping the device with a platinized ITO/glass counter electrode. Photocurrent (PC) spectra were measured using a lock-in amplifier (SR830). The device was illuminated through the working electrode side using a xenon lamp, which output was dispersed in a monochromator and chopped with a frequency of 15 Hz. The excitation area was approximately 4 mm$^2$ with excitation power of about 0.25 µW/mm$^2$ (at λ=420 nm).

Characterization

UV-vis absorption and photoluminescence spectra were recorded using CARY 50 Scan spectrophotometer, Simadzu UV-3600 UV-Vis-NIR spectrophotometer, and Jobin Yvon Fluorolog FL3-11 fluorescence spectrophotometer. High resolution transmission electron microscopy measurements were carried out using JEOL 3011UHR, operated at 300 kV. High angular annular dark field scanning transmission electron microscopy was performed using JEOL 2010 transmission electron microscope. Specimens were prepared by depositing a drop of nanocrystal toluene solution onto a carbon-coated copper grid and letting it dry in air. X-ray powder diffraction measurements were carried out on Scintag XDS-2000 X-Ray Powder Diffractometer. Scanning electron micrograph was taken using Inspect F Scanning Electron Microscope (SEM) and Energy Dispersive X-ray (EDX) emission spectra were measured using an EDAX X-ray detector located inside the SEM. The electron beam was accelerated at 10 kV.

Fluorescence Lifetime Measurements

FL lifetime measurements were performed using a time correlated single photon counting setup utilizing SPC-630 single photon counting PCI card (Becker& Hickle CmbH), picosecond diode laser operating at 400 nm, as an excitation source (Picoquant), and id50 avalanche photodiode (Quantique). The repetition rate of the laser was chosen to allow for a 1000 ns time window, while the pulse fluence was adjusted to produce about 1 emission photon per 100 excitation pulses (excitation power was 70 μW).

Results and Discussion

The shape of the composite nano-object forming as a result of solution-phase coupling of the two structurally dissimilar materials is determined by the interplay between the total surface energy of the composite structure and the solid-solid interfacial energy, which is related to the mismatch-induced strain between the two merging lattices. If the interfacial strain is low, the two materials can be joined epitaxially over large surface areas, using, for instance, standard methods of chemical and physical vapor deposition. In the case when the interfacial strain exceeds the surface tension of both material domains, the uniform and continuous growth of material layers is no longer possible. Instead, the composite structure undergoes a spatial rearrangement that eliminates some of the interfacial region by increasing the overall surface area[79]. Such growth mechanism has been previously observed for PbS/TiO$_2$ heterostructures, fabricated via chemical bath deposition route, where the formation of island-like PbS domains was apparent[36]. Due to the lack of synthetic means for controlling the surface tension of growing PbS NCs within the CBD approach, it was generally impossible to achieve a narrow distribution of PbS diameters.

A colloidal, non-aqueous approach to the synthesis of heterostructured materials provides an additional degree of freedom in controlling the shape of composite nanoparticles, associated with the presence of surface-passivating ligands, which can be used to modulate the surface tension of growing crystallites. By optimizing the type and the concentration of ligand molecules in the growth solution, it is often possible to accommodate the misfit-induced interfacial strain between the two semiconductor materials and to coerce the narrow size distribution of growing domains. In accordance with the present invention, the effect of various ligand combinations as well as their concentrations on the overall shape of PbS/TiO$_2$ heterostructures are revealed, specifically targeting those synthetic conditions that lead to the narrow distribution of PbS diameters. In a typical procedure, the PbS deposition step is performed using a combination of OA, and OLAM ligands dispersed in the ODE solution (see the Experimental Section). By employing a binary mixture of strong (OA) and weak (OLAM) ligands, the present invention allows one to independently control the strength and the concentration of surface molecules on PbS NCs. Here, to explore the effect of surface passivation on the shape of PbS NCs, several experiments utilizing different concentrations of OA and OLAM surfactants were performed. Further optimization of the PbS NC shape was then carried out by varying the concentrations of Pb and S precursors in a growth solution containing a fixed concentration of TiO$_2$ nanoparticles.

FIG. 5(a)-(f) show TEM images of PbS/TiO$_2$ nano-composites fabricated under various synthetic conditions in accordance with another embodiment of the present invention: (a). High concentration level of OA in the growth solution results in the formation of small-diameter (d<3 nm) PbS domains (b). The formation of single, large-diameter PbS NCs (d>4) is dominant when the concentration of OA in the solution is low (see text for details). (c) The formation of multiple large-diameter PbS NCs per single nanorod occurs when the concentration of OA is low, while concentrations of Pb and S precursors are high. (d-f). High-resolution TEM images of nano-composites shown in (a-c), respectively.

A careful analysis of PbS/TiO$_2$ shapes reveals that the formation of small- and large-diameter PbS NCs on the surface of TiO$_2$ occurs via two independent mechanisms. For instance, smaller-size PbS "islands" ranging from 2 to 4 nm in diameter tend to be symmetrically distributed throughout the surface of nanorods (NRs). Such uniform coverage of PbS NCs on TiO$_2$ can be explained in terms of fundamental energy requirements on the deposition of the secondary material in hetero-epitaxial growth. Namely, spatially isotropic addition of PbS monomers onto TiO$_2$ NRs initially results in the formation of a thin PbS shell, which can be identified in structures sampled at intermediate steps. A subsequent lateral expansion of this shell causes a mismatch-induced increase of the interfacial energy, and, therefore, promotes the collapse of the PbS layer into segregated islands.

While the coalescence of the PbS shell into evenly-distributed spherical domains seems to be consistent with the structural appearance of small-diameter PbS on TiO$_2$ (see, for example, FIGS. 1a and 1d), this process cannot explain the formation of large-diameter PbS NCs that tend to grow only at specific locations along the TiO$_2$ surface. Strong evidence supporting the independent growth mechanism in this case is provided by the fact that the formation of large-diameter PbS NCs can occur simultaneously with smaller PbS, as seen in high-resolution TEM and high angular annular dark field scanning transmission electron microscopy (HAADF-STEM) images of mixed heterostructures, and the fact that in contrast to small-diameter PbS, the growth rate of larger PbS NCs is strongly correlated with the concentration of Pb and S precursor in the solution. Based on these observations, the present invention demonstrates that larger PbS NCs form at locations of low interfacial stress, which would allow for near-epitaxial relationships at the PbS/TiO$_2$ boundary and the ensuing uniform expansion of the PbS lattice. These locations are likely to contain irregularities of the TiO$_2$ lattice that promote a preferential merging of 001 and 100 faces of anatase TiO$_2$ and rock-salt PbS crystal lattices, which otherwise correspond to a substantial 6.9% lattice mismatch.

Figure 6:
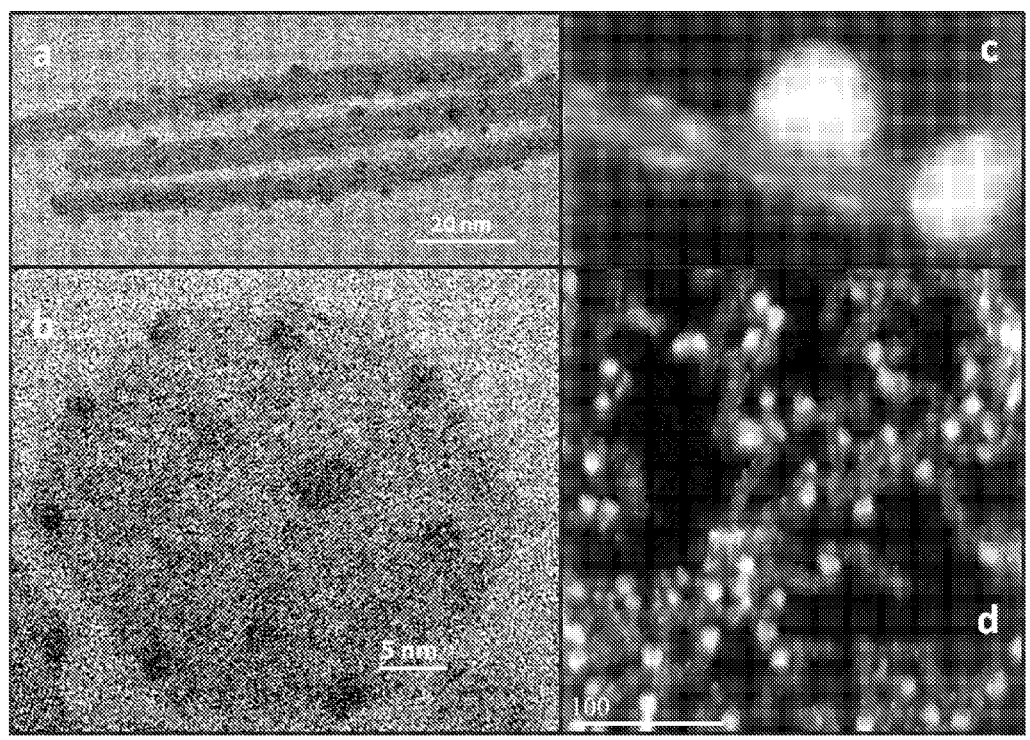
FIGS. 6(a) and 6(b) show TEM images of PbS/TiO$_2$ superstructures self-assembled from PbS/TiO$_2$ nano-composites either through longitudinal (a) or lateral (b) attachment of TiO$_2$ domains. (c, d). HAADF-STEM images of PbS/TiO$_2$ heterostructures comprising both small (d=2.2 nm) and large (d=7.1 nm) PbS NCs, in accordance with another embodiment of the present invention.

FIGS. 6(a) and 6(b) show TEM images of PbS/TiO$_2$ superstructures self-assembled from PbS/TiO$_2$ nano-composites either through longitudinal (a) or lateral (b) attachment of TiO$_2$ domains. (c, d). HAADF-STEM images of PbS/TiO$_2$ heterostructures comprising both small (d=2.2 nm) and large (d=7.1 nm) PbS NCs.

Figure 5:
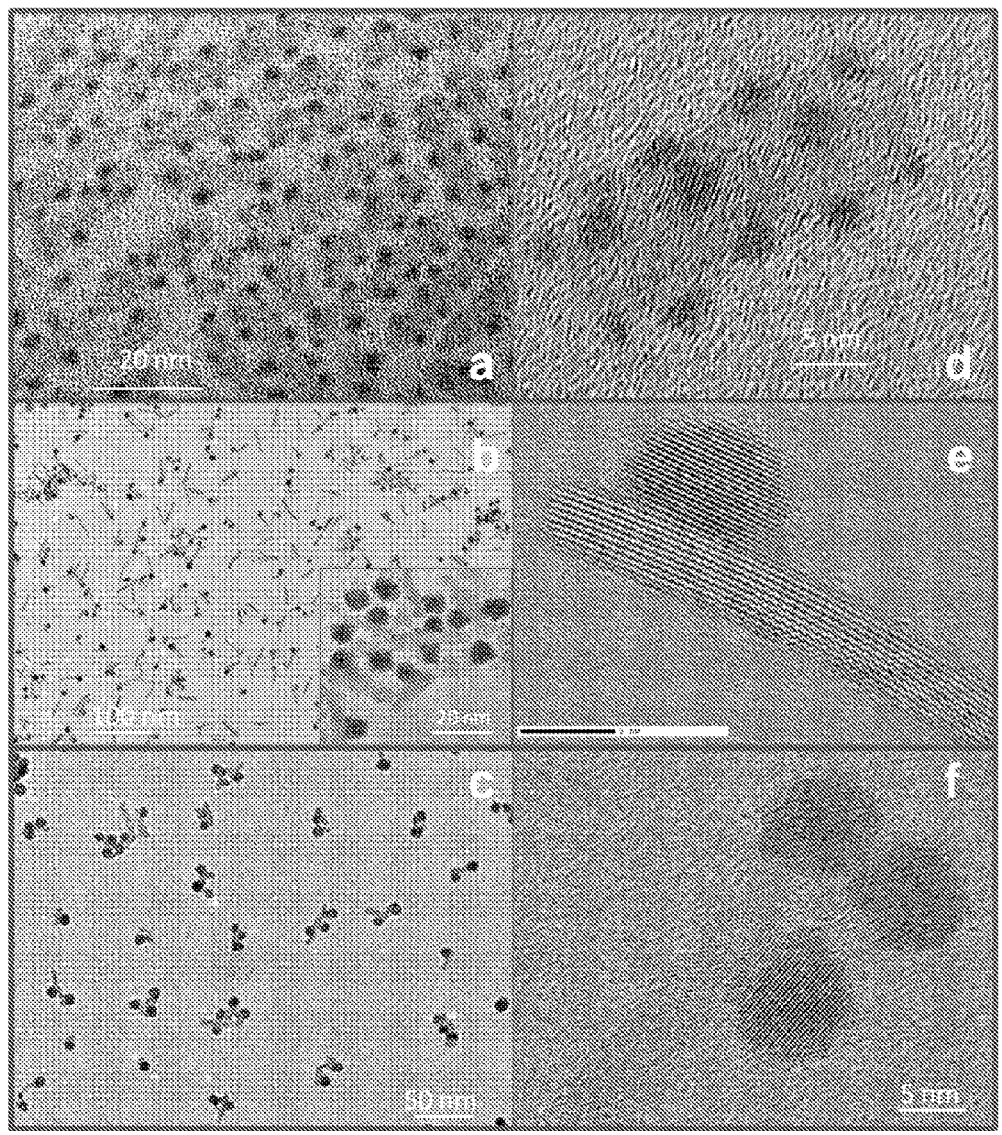
FIG. 5(a)-(f) show TEM images of PbS/TiO$_2$ nano-composites fabricated under various synthetic conditions in accordance with another embodiment of the present invention.

Suppression or enhancement of a specific PbS deposition mode, described above, can be achieved by varying the concentration of oleic acid in the growth solution. Typically, the formation of large diameter PbS is favored when the molar ratio of OA (used for the dissolution of Pb precursor) to ODE is less than 0.2 and the ratio of PbO to ODE is at least 0.25. Lowering the concentration of OA for a fixed amount of PbO below OA/ODE=0.2, leads to a significant drop in the actual concentration of OA in the solution due to the formation of Pb-oleate complexes, which results in the growth of large PbS structures that tend to encase $TiO_2$ nanoparticles (NPs) within their volume. A similar structural type of $PbS/TiO_2$ nano-composites can also be formed when the amount of PbO is increased with respect to OA (molar ratio of PbO/OA>1.5), which depletes the amount of desorbed OA molecules in the solution. On the other hand, if the concentration of OA is high (OA/ODE>0.2), the growth of large-diameter PbS domains is suppressed, and the formation of small, uniformly-distributed PbS domains becomes dominant (FIG. 5a).

A ligand-induced control over the shape of growing nanocrystals can also be applied to oxide domains of $PbS/TiO_2$ nano-composites. For instance, during the first stage of the synthesis, the shape of $TiO_2$ nanorods is only weakly affected even by strong variations (up to 300%) in the relative molar ratio of stabilizing agents (OA/OLAM). However, for the PbS deposition step, even a small reduction in the concentration of injected OA (added during the precursor injection) to that of OLAM (OA/OLAM<0.3) can enable a coalescence of PbS/$TiO_2$ heterostructures either via longitudinal or lateral attachment of nanorod domains. Examples of both are shown in FIGS. 6(a) and (b). Such merging of $PbS/TiO_2$ via $TiO_2$ domains increases the average size of $TiO_2$ nanoparticles in the sample, and could be employed for the development of NCs films with large-grain sizes, potentially matching those of commercially available $TiO_2$ pastes (e.g. Merck or Degussa), fabricated via aqueous routes.

Figure 7:
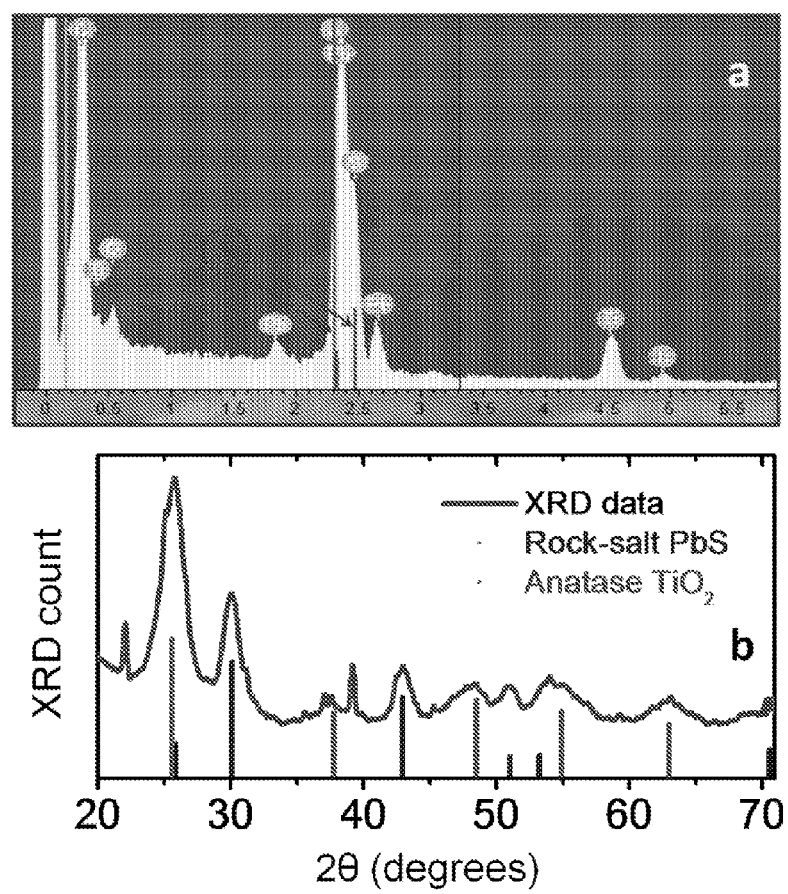
FIG. 7 shows the structural analysis of PbS/TiO$_2$ nano-composites (with 2.3-nm PbS NCs) using EDX and XRD techniques, in accordance with another embodiment of the present invention.

FIG. 7 shows the structural analysis of $PbS/TiO_2$ nano-composites (with 2.3-nm PbS NCs) using EDX and XRD techniques: (a) A typical EDX scan of a $PbS/TiO_2$ nanoparticle film confirming the presence of Pb, S, Ti, and O elements in fabricated materials. (b) A typical XRD spectrum of $PbS/TiO_2$ nanoparticle powder showing characteristic Bragg lines indexed to the rock-salt PbS and anatase $TiO_2$ crystal lattices.

To perform further structural analysis, fabricated $PbS/TiO_2$ were repeatedly washed to remove any unreacted precursors and finally precipitated in the form of NC powder. These powders were subsequently analyzed using x-ray powder diffraction (XRD) and energy dispersive x-ray (EDX) techniques, (FIG. 7), for the case of 4.2-nm-diameter PbS NCs on $TiO_2$ nanorods. A typical EDX spectrum in FIG. 7a, confirms the presence of Pb, Ti, S, and O elements in grown nano-composites, while XRD measurements (FIG. 7b) indicate the presence of both PbS (rock-salt) and $TiO_2$ (anatase) crystal structures.

Figure 8:
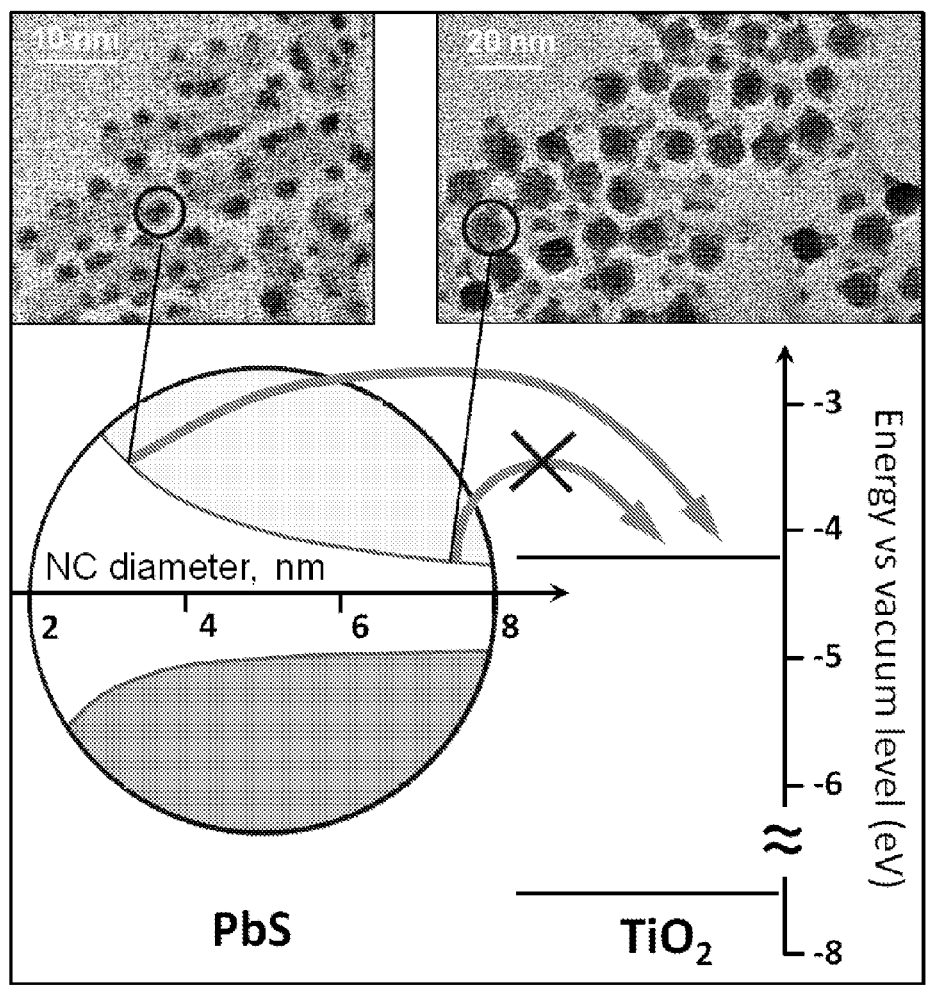
FIG. 8 shows an energy diagram showing a relative alignment of the conduction and valence band edges in PbS/TiO$_2$ heterostructures, in accordance with another embodiment of the present invention.

FIG. 8 shows an energy diagram showing a relative alignment of the conduction and valence band edges in $PbS/TiO_2$ heterostructures. According to the expected relationship between the energy of $1S_e$ (PbS) state and the nanocrystal size, the photoinduced electron transfer from PbS to $TiO_2$ domain is allowed only if the diameter of PbS NCs is less than 7 nm.

FIG. 8 shows an energy diagram showing a relative alignment of the conduction and valence band edges in $PbS/TiO_2$ heterostructures, in accordance with another embodiment of the present invention.

It is expected that optoelectronic properties of $PbS/TiO_2$ heterostructures are strongly dependent on the average size of the PbS domain. According to the energy diagram of excited-state levels[70,71], in FIG. 8, a photoinduced electron transfer across $PbS/TiO_2$ interface is energetically allowed only when the diameter of PbS NCs is below 7 nm. In this case, the staggered alignment of conduction and valence band edges at the $PbS/TiO_2$ interface creates positive exothermicity that drives the electron transfer reaction. Conversely, for PbS nanoparticles with diameters greater than 7 nm, the $PbS/TiO_2$ heterostructure exhibits type I alignment of band edges, in which case both excited carriers remain within the PbS material.

The size-dependent alignment of energy levels in $PbS/TiO_2$ nano-composites is reflected in optical properties of these colloids. For instance, the absorption profile of $PbS/TiO_2$ nanoparticles, comprising small diameter (d=2.3 nm) PbS NCs is characteristic of type II heterostructures with non-zero photon absorption in the spectral range below the band gap of both PbS (edge at 600 nm) and $TiO_2$ materials. This infrared component arises due to excitations of intermediate states that exist at the junction of epitaxially coupled domains[73], and is beneficial for photovoltaic applications of these nano-composites, as it red-shifts the absorption range of $PbS/TiO_2$ by several hundreds of nanometers.

In addition to the infrared tail, the absorption profile in FIG. 9b shows a small excitonic peak near 600 nm, which spectral position agrees well with the expected band gap absorption in 2.3-nm PbS NCs. This feature is absent in the spectrum of mixed $PbS/TiO_2$ heterostructures (green curve) possibly due to the overlapping absorption of large-diameter PbS NCs. Likewise, there is no clear indication of band edge transitions in $PbS/TiO_2$ nanoparticles, comprising only large-diameter PbS NCs (d=4.2 nm). The absence of the excitonic peak in the latter case cannot be attributed to the sample inhomogeneity alone, since the size dispersion of PbS NCs in these heterostructures is only 12%, and is likely to arise from excitations of intermediate states that exist at the interface of PbS and $TiO_2$ domains.

Figure 9:
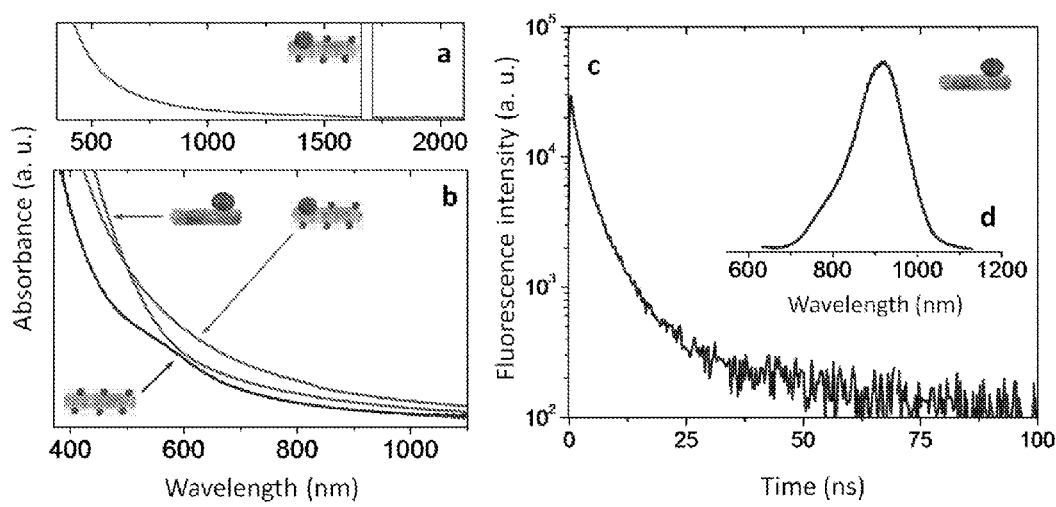
FIG. 9 shows the optical properties of PbS/TiO$_2$ heterostructures. (a-b). Absorbance of PbS/TiO$_2$ nano-composites representing several structural types. (c). Fluorescence intensity decay and emission profile (d) of PbS/TiO$_2$ heterostructures comprising 4.2 nm PbS NCs, in accordance with another embodiment of the present invention.

FIG. 9 shows the optical properties of $PbS/TiO_2$ heterostructures. (a-b). Absorbance of $PbS/TiO_2$ nano-composites representing several structural types. (c). Fluorescence intensity decay and emission profile (d) of $PbS/TiO_2$ heterostructures comprising 4.2 nm PbS NCs, in accordance with another embodiment of the present invention.

$PbS/TiO_2$ heterostructures comprising small-diameter PbS NCs showed very weak or no fluorescence in the energy range corresponding to 1S(e)-1S(h) carrier recombination, while nanoparticles containing larger PbS domains generally produced somewhat stronger emission in the near-infrared ($\lambda$=800-1200 nm). This result is consistent with the prediction that small-diameter PbS are more likely to inject excited carriers into $TiO_2$, leaving only a small fraction of excited population to decay via radiative channels. An example of a typical emission spectrum corresponding to 4.2-nm PbS-modified $TiO_2$ nanoparticles is shown in FIG. 9c. A good agreement between the size of PbS NCs and the spectral position of the FL peak provides strong support to the hypothesis that the origin of the emission is the band edge recombination of carriers in PbS NCs and not the decay of surface or interfacial trap states. The corresponding values of the fluorescence lifetime, measured using time correlated single photon counting technique (TCSPC), were found to be in the range of 2 to 5 ns, which is substantially shorter than 1-1.8 μs reported[75] for isolated PbS NCs. This 500-fold decrease in the lifetime of $TiO_2$-bound PbS NCs is attributed to the transfer of photoinduced electrons from the conduction edge of PbS NCs into excited states of $TiO_2$ NRs.

In a conventional architecture of NC-sensitized solar cells, charge collection mechanism relies on a common acceptor domain, often a mesoporous film of $TiO_2$, to harvest photo-induced carriers from multiple sensitizers. In these cells, photoinduced charge separation is followed by the injection of negative carriers into the oxide film, which serves as a low-resistance pathway for carrier migration towards a working electrode. In case of PbS/TiO$_2$ nano-composites, fabricated in this work, a flow of carriers towards a working electrode is obstructed by the presence of organic ligands, which passivate the surface of individual TiO$_2$ nanorods. To remedy this and enable carrier conductivity through the PbS/TiO$_2$ matrix, isolated nanorod domains can be coupled together via epitaxial relationships whereby forming a common conduction path for carrier migration. This step should also facilitate the formations of all-inorganic porous solids or nano-nets, needed for an efficient regeneration of sensitizer holes. Coupling of TiO$_2$ domains has been extensively researched for the case of aqueous TiO$_2$ nanoparticles, where merging is typically achieved by annealing of spincoated or "doctor-bladed" films at 400-450° C. In case of organically passivated TiO$_2$ nanorods, however, a high-temperature annealing step may result in the adverse contamination of TiO$_2$ nanorods and PbS NCs with carbon-based residues, potentially leading to a high density of lattice defects. To minimize the effect of contaminations, long-chain ligands (OA and OLAM) on PbS/TiO$_2$ colloids were replaced with shorter and more volatile pyridine molecules prior to annealing of the film.

The ligand exchange in PbS/TiO$_2$ nano-composites was performed according to a previously reported procedure[62]. An apparent reduction in the solution opacity indicated a successful replacement of bulky ligands, at which point the mixture was centrifuged and the precipitate was discarded. After removing any excessive solvent from the suspension, a small fragment of the residual paste-like precipitate was taken for further examination in TEM.

Figure 10:
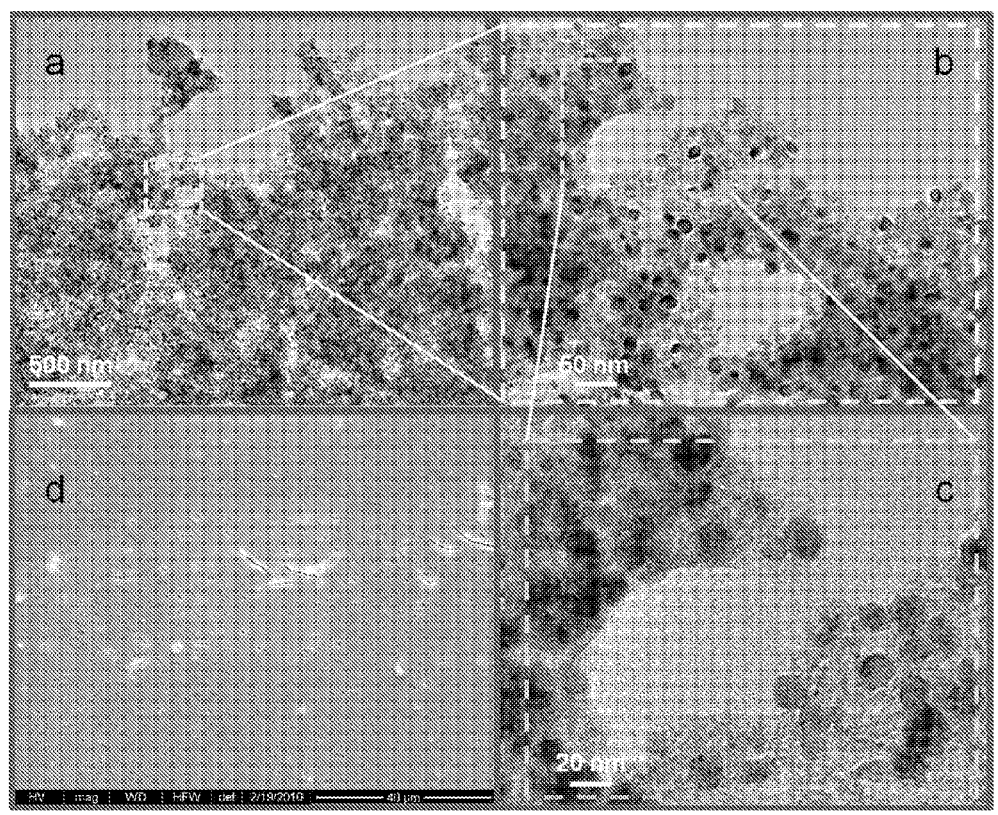
FIG. 10 shows TEM images of pyridine-coated PbS/TiO$_2$ nano-composites and a scanning Electron Microscope image of a PbS/TiO$_2$ film on ITO substrate, in accordance with another embodiment of the present invention.

FIG. 10 shows typical low-magnification images of pyridine-coated PbS/TiO$_2$ heterostructures, which, upon solvent evaporation, tend to aggregate into micron-size "nets". The visual decrease in the volume of empty spaces between nanoparticles was consistent with the presence of shorter pyridine ligands on nanocrystal surfaces.

To prepare a working electrode, a thin layer of PbS/TiO$_2$ nano-composites was deposited onto a indium-tin-oxide (ITO) covered glass using a doctor-blade technique and subsequently annealed at 270° C. The present invention demonstrates that without further improvement of developed nanoparticle pastes, good film quality and satisfactory adhesion to the substrate could be achieved only for relatively thin films of PbS/TiO$_2$ (A=0.25 at λ=500 nm), while thicker films tended to corrugate (see FIG. 10d) and partly peel off the substrate after the annealing step. Upon deposition of the film, the ITO electrode was incorporated into a prototype cell comprising a platinum coated counter electrode and a liquid electrolyte for photocurrent measurements. The illumination of the cell was done through the working electrode side of the device.

Regeneration of holes in PbS sensitizes poses several experimental challenges associated with the rapid corrosion of nanocrystals and irreversible character of electrolytes. While recent studies by M. Grätzel and M. K. Nazeeruddin groups have identified a few promising redox couples based on solid spiro-OMeTAD [2,20,7,70,-tetrakis(N,N-di-p-methoxyphenylamine)-9, and [Co(o-phen)3]$^{2+/3+}$ complex in acetonitrile/ethylene carbonate[64] that show reversible and stable regeneration of holes in PbS NCs, these hole scavenging materials are still prepared by individual research groups and are not yet commercially available. Consequently, the photoaction of PbS/TiO$_2$ films fabricated in this work was tested using an available but somewhat corrosive polysulfide redox couple (see the Experimental Section), which tends to oxidize PbS NCs yielding PbSO$_4$. The formation of PbSO$_4$ in a PbS/TiO$_2$ photochemical cell slowly deteriorates its photocurrent at short circuit with time of illumination due to the loss of the electrode material. Therefore, instead of measuring absolute efficiencies, the evaluation of the cell performance was done through a comparison of measured photocurrents with those of photochemical cells prepared via chemical bath deposition from nanocrystalline TiO$_2$ (Degussa P-25). All measurements were conducted immediately upon cell fabrication to avoid material degradation due to electrolyte exposure. Preparation of PbS-modified TiO$_2$ electrode through a 6-cycle CBD process for comparative studies was done according to the Ref. 69 and is fully described in the Experimental and Supporting Information sections.

Figure 11:
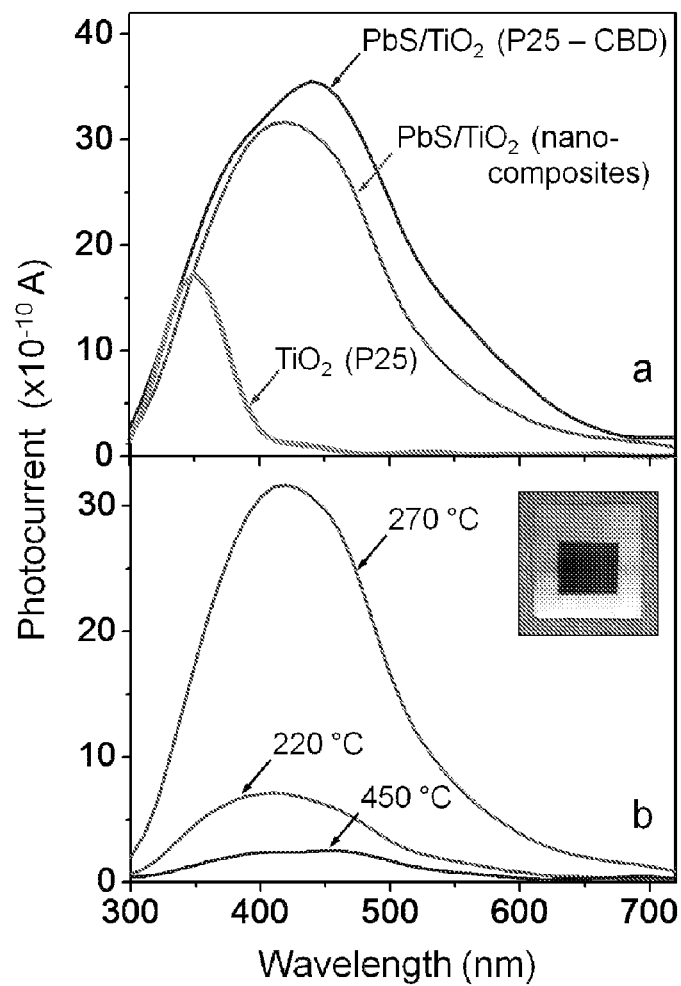
FIG. 11 shows a comparison of the two photocurrent measurements obtained using PbS/TiO$_2$ nano-composite films (red curve) and PbS-modified P25 TiO$_2$ films fabricated via chemical bath deposition technique (blue curve), in accordance with another embodiment of the present invention.

FIG. 11 shows a comparison of the two photocurrent measurements obtained using PbS/TiO$_2$ nano-composite films (red curve) and PbS-modified P25 TiO$_2$ films fabricated via chemical bath deposition technique (blue curve). Photocurrent measurement from pure TiO$_2$ films on ITO-covered glass is also shown (grey curve). (b) The effect of the annealing temperature on the photocurrent of PbS/TiO$_2$ nano-composite films.

FIG. 11a compares the photocurrent spectra of the two cells fabricated from the reported PbS/TiO$_2$ nano-composite films (red curve) and TiO$_2$ nanoparticle films (P25, Degussa) with CBD-grown PbS NCs (blue curve). The signal from pure TiO$_2$ is also shown for comparison. According to FIG. 7a, photocurrents of both cells span the entire visible spectrum and have similar magnitudes throughout the illumination range. Several additional tests performed on other cell pairs confirmed the closeness of the photoresponse between the two types of devices, implying similar conversion efficiencies. Owing to the fact that the deposition of reported PbS/TiO$_2$ nano-composite paste was not optimized and the film itself absorbed less than 45% of incident light at λ=500% (in contrast to P25 TiO$_2$ films that absorb more than 95%), the observed photocurrent response was found to be encouraging. Furthermore, the highest value of photocurrent from nano-composite films was achieved using a relatively low annealing temperature (270° C.) as shown in FIG. 7b, which is 180 degrees below the annealing temperature required to sinter P25 TiO$_2$ nanoparticle films.

In conclusion, the present invention demonstrates a colloidal synthesis of PbS/TiO$_2$ nano-composites comprising epitaxial assemblies of PbS NCs and TiO$_2$ nanorods that can be deployed for the development of solution-processed photovoltaic devices. The size of PbS domains can be tuned from 2 to 20 nm using standard methods of colloidal synthesis, which provides an experimental tool for optimizing the rates of carrier injection into oxide domains. It has also been found that nano-composite films comprising 5 nm PbS NCs and annealed at 270° C. enable the highest value of the photocurrent, while the photoresponse of films containing large-diameter PbS NCs (d>10 nm) is essentially zero. Light-harvesting characteristics of PbS/TiO$_2$ nano-composites are explored using an alternative architecture of NC-sensitized solar cells, which provides an easy method to combine high-quality colloidal nanocrystals with an all-inorganic donor-acceptor interface. In light of the renewed interest in NC-sensitized solar cells driven by on-going research and discovery of non-corrosive and longer-lasting hole scavenging materials, the demonstrated hetero-epitaxial PbS/TiO$_2$ films could potentially pave the way for the development of high performance light-harvesting devices.

REFERENCES

[1] Linsebigler, A. L.; Lu, G. Q.; Yates, J. T. *Chem. Rev.* 1995, 95, 735.
[2] Oregan, B.; Grätzel, M. *Nature* 1991, 353, 737.
[3] Augustynski, J. *Electrochim. Acta* 1993, 38, 43.
[4] Kay, A.; Grätzel, M. *J. Phys. Chem.* 1993, 97, 6272.
[5] Gerischer, H.; Luebke, M. *J. Electroanal. Chem.* 1986, 204, 225.
[6] Robel, I.; Subramanian, V.; Kuno, M.; Kamat, P. V. *J. Am. Chem. Soc.* 2006, 128, 2385.
[7] Sasha, G.; Gary, H. *J. Phys. Chem.* 1994, 98, 5338.
[8] Niitsoo, O.; Sarkar, S. K.; Pejoux, C.; Ruhle, S.; Cahen, D.; Hodes, G. *J. Photochem. Photobiol. A* 2006, 181, 306.
[9] Hao, E.; Yang, B.; Zhang, J.; Zhang, X.; Sun, J.; Shen, J. *J. Mater. Chem.* 1999, 8, 1327.
[10] Fang, J. J.; Wu, J. X.; Lu, X.; Shen, Y.; Lu, Z. *Chem. Phys. Lett.* 1997, 270, 145.
[11] Wijayantha, K. G. U.; Peter, L. M.; Otley, L. C. *Sol. Energ. Mater. Sol. Cell.* 2004, 83, 363.
[12] Mora-Sero, I.; Bisquert, J.; Dittrich, T.; Belaidi, A.; Susha, A. S.; Rogach, A. L. *J. Phys. Chem. C* 2007, 111, 14889.
[13] Lee, J. C.; Sung, Y. M.; Kim, T. G.; Choi, H. J. *Appl. Phys. Lett.* 2007, 91, 113104.
[14] Prabakar, K.; Takahashi, T.; Nakashima, T.; Kubota, Y.; Fujishima, A. *J. Vac. Sci. Technol. A* 2006, 24, 1613.
[15] Lopez-Luke, T.; Wolcott, A.; Xu, L. P.; Chen, S. W.; Wcn, Z. H.; Li, J. H.; De La Rosa, E.; Zhang, J. Z. *J. Phys. Chem. C* 2008, 112, 1282.
[16] Yu, P. R.; Zhu, K.; Norman, A. G.; Ferrere, S.; Frank, A. J.; Nozik, A. J. *J. Phys. Chem. B* 2006, 110, 25451.
[17] Vogel, R.; Hoyer, P.; Weller, H. *J. Phys. Chem.* 1994, 98, 3183.
[18] Hoyer, P.; Konenkamp, R. *Appl. Phys. Lett.* 1995, 66, 349.
[19] Plass, R.; Pelet, S.; Krueger, J.; Grätzel, M.; Bach, U.: *J. Phys. Chem. B* 2002, 106, 7578.
[20] Nozik, A. *J. Physica E* 2002, 14, 115.
[21] Yu, P. R.; Zhu, K.; Norman, A. G.; Ferrere, S.; Frank, A. J.; Nozik, A. J. *J. Phys. Chem. B* 2006, 110, 25451.
[22] Wang, C.; Kwon, K. W.; Odlyzko, M. L.; Lee, B. H.; Shim, M. *J. Phys. Chem. C* 2007, 111, 11734.
[23] Hyun, B. R.; Zhong, Y. W.; Bartnik, A. C.; Sun, L.; Abruña, H. D.; Wise, F. W.; Goodreau, J. D.; Matthews, J. R.; Leslie, T. M.; Borrelli, N. F. *ACS Nano* 2008, 2, 2206.
[24] Baker, D. R.; Kamat, P. V. *Adv. Funct. Mater.* 2009, 19, 805.
[25] Niitsoo, O.; Sarkar, S. K.; Pejoux, C.; Ruhle, S.; Cahen, D.; Hodes, G. *J. Photoch. Photobio. A* 2006, 181, 306.
[26] Das, K.; De, S. K. *J. Phys. Chem. C* 2009, 113, 3494.
[27] Morgan, N. Y.; Leatherdale, C. A.; Drndic, M.; Jarosz, M. V.; Kastner, M. A.; Bawendi, M. *Phys. Rev. B* 2002, 66, 075339.
[28] Jarosz, M. B.; Porter, V. J.; Fisher, B. R.; Kastner, M. A.; Bawendi, M. G. *Phys. Rev. B* 2004, 70, 195327.
[29] Vanmaekelbergh, D.; Liljeroth, P. *Chem. Soc. Rev.* 2005, 34, 299.
[30] Zeng, H.; Li, J.; Liu, J. P.; Wang, Z. L.; Sun, S. H. *Nature* 2002, 420, 395.
[31] Talapin, D. V.; Murray, C. B. *Science* 2005, 310, 86.
[32] Soreni-Hararl, M.; Yaacobi-Gross, N.; Steiner, D.; Aharoni, A.; Banin, U.; Millo, O.; Tessler, N. *Nano Lett.* 2008, 8, 678.
[33] Grätzel, M. *J. Photochem. Photobiol. A* 2004, 164, 3.
[34] Wang, P.; Zakeeruddin, S. M.; Humphry-Baker, R.; Grätzel, M. *Chem. Mater.* 2004, 16, 2694.
[35] Bai, Y.; Cao, Y.; Zhang, J.; Wang, M.; Li, R.; Wang, P.; Zakeeruddin, S. M.; Grätzel, M. *Nat. Mater.* 2008, 7, 626.
[36] Lee, H.; Leventis, H. C.; Moon, S.-J.; Chen, P.; Ito, S.; Hague, S. A.; Torres, T.; Nüesch, F.; Geiger, T.; Zakeeruddin, S. M.; Grätzel, M.; Nazeeruddin, M. K. *Adv. Funct. Mater.* 2009, 19, 2735.
[37] Schmidt-Mende, L.; Grätzel, M. *Thin Solid Films* 2006, 500, 296.
[38] Gerischer, H.; Lubke, M. *J. Electroanal. Chem.* 1986, 204, 225.
[39] Robel, I.; Subramanian, V.; Kuno, M.; Kamat, P. V. *J. Am. Chem. Soc.* 2006, 128, 2385.
[40] Gorer, S.; Hodes, G. *J. Phys. Chem.* 1994, 98, 5338.
[41] Niitsoo, 0.; Sarkar, S. K.; Pejoux, C.; Ruhle, S.; Cahen, D.; Hodes, G. *J. Photochem. Photobiol. A: Chem.* 2006, 181, 306.
[42] Hao, E. C.; Yang, B.; Zhang, J. H.; Zhang, X.; Sun, J. Q.; Shen, S. C. *J. Mater. Chem.* 1998, 8, 1327.
[43] Fang, J. H.; Wu, J. W.; Lu, X. M.; Shen, Y. C.; Lu, Z. H. *Chem. Phys. Lett.* 1997, 270, 145.
[44] Wijayantha, K. G. U.; Peter, L. M.; Otley, L. C. *Sol. Energ. Mater. Sol. Cell.* 2004, 83, 363.
[45] Mora-Sero, I.; Bisquert, J.; Dittrich, T.; Belaidi, A.; Susha, A. S.; Rogach, A. L. *J. Phys. Chem. C* 2007, 111, 14889.
[46] Lee, J. C.; Sung, Y. M.; Kim, T. G.; Choi, H. J. *Appl. Phys. Lett.* 2007, 91, 113104.
[47] Prabakar, K.; Takahashi, T.; Nakashima, T.; Kubota, Y.; Fujishima, A. *J. Vac. Sci. Technol. A* 2006, 24, 1613.
[48] Lopez-Luke, T.; Wolcott, A.; Xu, L. P.; Chen, S. W.; Wcn, Z. H.; Li, J. H.; De La Rosa, E.; Zhang, J. Z. *J. Phys. Chem. C* 2008, 112, 1282.
[49] Yu, P. R.; Zhu, K.; Norman, A. G.; Ferrere, S.; Frank, A. J.; Nozik, A. J. *J. Phys. Chem. B* 2006, 110, 25451.
[50] Vogel, R.; Hoyer, P.; Weller, H. *J. Phys. Chem.* 1994, 98, 3183.
[51] Kirsanova, M.; Nemchinov, A.; Hewa-Kasakarage, N. N.; Schmall, N.; Zamkov, M. *Chem. Mater.* 2009, 21, 4305.
[52] Pathan, H. M.; Lokhande, C. D. *Bull. Mater. Sci.* 2004, 27, 85.
[53] Peter, L. M.; Riley, D. J.; Tull, E. J.; Wijayantha, K. G. U. *Chem. Commun.* 2002, 1030.
[54] Robel, I.; Subramanian, V.; Kuno, M.; Kamat, P. V. *J. Am. Chem. Soc.* 2006, 128, 2385.
[55] Kongkanand, A.; Tvrdy, K.; Takechi, K.; Kuno, M.; Kamat, P. V. *J. Am. Chem. Soc.* 2008, 130, 4007.
[56] Wang, C. J.; Kwon, K. W.; Odlyzko, M. L.; Lee, B. H.; Shim, M. *J. Phys. Chem. C* 2007, 111, 11734.
[57] Hyun, B. R.; Zhong, Y. W.; Bartnik, A. C.; Sun, L.; Abruña, H. D.; Wise, F. W.; Goodreau, J. D.; Matthews, J. R.; Leslie, T. M.; Borrelli, N. F. *ACS Nano* 2008, 2, 2206.
[58] Lee, H. J.; Yum, J.-H.; Leventis, H. C.; Zakeeruddin, S. M.; Hague, S. A.; Chen, P.; Seok, S. I.; Grätzel, M.; Nazeeruddin, M. K. *J. Phys. Chem. C* 2008, 112, 11600.
[59] Yochelis, S.; Hodes, G. *Chem. Mater.* 2004, 16, 2740.
[60] Baker, D. R.; Kamat, P. V. *Adv. Funct. Mater.* 2009, 19, 805.
[61] Sun, W. T.; Yu, Y.; Pan, H.-Y.; Gao, X.-F.; Chen, Q.; Peng, L. M. *J. Am. Chem. Soc.* 2008, 130, 1124.
[62] Murray, C. B.; Norris, D. J.; Bawendi, M. G. *J. Am. Chem. Soc.* 1993, 115, 8706
[63] Wang, P.; Zakeeruddin, S. M.; Moser, J.-E.; Grätzel, M. *J. Phys. Chem. B* 2003, 107, 13280.
[64] Lee, H. J.; Chen, P.; Moon, S.-J.; Sauvage, F.; Sivula, K.; Bessho, T.; Gamelin, D. R.; Comte, P.; Zakeeruddin, S. M.; II Seok, S.; Grätzel, M.; Nazeeruddin, M. K. *Langmuir* 2009, 25, 7602.
[65] Buonsanti, R.; Grillo, V.; Carlino, E.; Giannini, C.; Curri, M. L.; Innocenti, C.; Sangregorio, C.; Achterhold, K.; Parak, F. G.; Agostiano, A.; Cozzoli, P. D. *J. Am. Chem. Soc.* 2006, 128, 16953.

[66] Acharya, K. P.; Alabi, T. R.; Schmall, N.; Hewa-Kasakarage, N. N.; Kirsanova, M.; Nemchinov, A.; Khon, E.; Zamkov, M. *J. Phys. Chem. C* 2009, 113, 19531.

[67] Markov, I. V. *Crystal Growth for Beginners: Fundamentals of Nucleation, Crystal Growth, and Epitaxy*; World Scientific: Singapore, Malaysia, 2003.

[68] Moreels, I.; Lambert, K.; Muynck, D. D.; Vanhaecke, F.; Poelman, D.; Martins, J. C.; Allan, G.; Zeger, H, *Chem. Mater.* 2007, 19, 6101.

[69] Klimov, V.; Hunsche, S.; Kurz, H. *Phys. Rev. B* 1994, 50, 8110-8113.

[70] Wehrenberg, B. L.; Guyot-Sionnest, P. *J. Am. Chem. Soc.* 2003, 125, 7806.

[71] Wei, S. H.; Zunger, A. *Phys. Rev B* 1997, 55, 13605.

[72] Seo, J.; Jun, Y.; Ko, S.; Cheon, J. *J. Phys. Chem. B* 2005, 109, 5389.

[73] Hewa-Kasakarage, N. N.; Kirsanova, M.; Nemchinov, A.; Schmall, N.; El-Khoury, P. Z.; Tarnovsky, A. N.; Zamkov, M. *J. Am. Chem. Soc.* 2009, 131, 1328.

[74] Evans, C. M.; Gou, L.; Peterson, J. J.; Maccagnano, S.; Krauss, T. D. *Nano Lett.* 2008, 8, 2896.

[75] Du, H.; Chen, C. L.; Krishnan, R.; Krauss, T. D.; Harbold, J. M.; Wise, F. W.; Thomas, M. G.; Silcox, *J. Nano Lett.* 2002, 2, 1321.

[76] An, J. M.; Franceschetti, A.; Zunger, A. *Nano Lett.* 2007, 7, 2129.

[77] Zhang, D. S. Yoshida, T.; Oekermann, T.; Furuta, K.; Minoura, H. *Adv. Funct. Mater.* 2006, 16, 1228.

[78] Lee, Y. L.; Chang, C. H. *J. Power Sources.* 2008, 185, 584.

[79] *Crystal Growth for Beginners: Fundamentals of Nucleation, Crystal Growth, and Epitaxy*; Markov, I. V.; World Scientific: Singapore, Malaysia, 2003.

[80] Greenham, N. C.; Peng, X. G.; Alivisatos, A. P. *Phys. Rev. B* 1996, 54, 17628.

[81] McDonald, S. A.; Konstantatos, G.; Zhang, S. G.; Cyr, P. W.; Klem, E. J. D.; Levina, L.; Sargent, E. H. *Nat. Mater.* 2005, 4, 138.

[82] Gunes, S.; Fritz, K. P.; Neugebauer, H.; Sariciftci, N. S.; Kumar, S.; Scholes, G. D. *Sol. Energy Mater. Sol. Cells* 2007, 91, 420.

[83] Maria, A.; Cyr, P. W.; Klern, E. J. D.; Levina, L.; Sargent, E. H. *Appl. Phys. Lett.* 2005, 87, 213112.

[84] Zhang, S.; Cyr, P. W.; McDonald, S. A.; Konstantatos, G.; Sargent, E. H. *Appl. Phys. Lett.* 2005, 87, 233101.

[85] Kim, S. J.; Kim, W. J.; Cartwright, A. N.; Prasad, P. N. *Appl. Phys. Lett.* 2008, 92, 191107.

[86] Wu, Y.; Wadia, C.; Ma, W. L.; Sadtler, B.; Alivisatos, A. P. *Nano Lett.* 2008, 8, 2551.

[87] Mitzi, D. B.; Yuan, M.; Liu, W.; Kellock, A. J.; Chey, S. J.; Deline, V.; Schrott, A. G. *Adv. Mater.* 2008, 20, 3657.

[88] Guo, Q.; Kim, S. J.; Kar, M.; Shafarman, W. N.; Birkmire, R. W.; Stach, E. A.; Agrawal, R.; Hillhouse, H. W. *Nano Lett.* 2008, 8, 2982.

[89] Koleilat, G. I.; Levina, L.; Shukla, H.; Myrskog, S. H.; Hinds, S.; Pattantyus-Abraham, A. G.; Sargent, E. H. *ACS Nano* 2008, 2, 833.

[90] Sargent, E. H. *Adv. Mater.* 2008, 20, 3958.

[91] Klem, E. J. D.; MacNeil, D. D.; Levina, L.; Sargent, E. H. *Adv. Mater.* 2008, 20, 3433.

[92] Law, M.; Beard, M. C.; Choi, S.; Luther, J. M.; Hanna, M. C.; Nozik, A. J. *Nano Lett.* 2008, 8, 3904.

[93] Huynh, W. U.; Dittmer, J. J.; Alivisatos, A. P. *Science* 2002, 295, 2425.

[94] Huynh, W. U.; Dittmer, J. J.; Teclemariam, N.; Milliron, D. J.; Alivisatos, A. P.; Barnham, K. W. J. *Phys. Rev. B* 2003, 67, 115326.

[95] Huynh, W. U.; Dittmer, J. J.; Libby, W. C.; Whiting, G. L.; Alivisatos, A. P. *Adv. Funct. Mater.* 2003, 13, 73.

[96] Sun, B. Q.; Marx, E.; Greenham, N. C. *Nano Lett.* 2003, 3, 961.

[97] Gunes, S.; Neugebauer, H.; Sariciftci, N. S.; Roither, H.; Kovalenko, M.; Pillwein, G.; Heiss, W. *Adv. Funct. Mater.* 2006, 16, 1095.

[98] Fritz, K. P.; Guenes, S.; Luther, J.; Kumar, S.; Sariciftci, N. S.; Scholes, G. D. *J. Photochem. Photobiol. A* 2008, 195, 39.

[99] Huynh, W. U.; Peng, X. G.; Alivisatos, A. P. *Adv. Mater.* 1999, 11, 923.

[100] Beek, W. J. E.; Wienk, M. M.; Janssen, R. A. J. *Adv. Funct. Mater.* 2006, 16, 1112.

[101] Beek, W. J. E.; Wienk, M. M.; Janssen, R. A. J. *Adv. Mater.* 2004, 16, 1009.

[102] Luther, J. M.; Law, M.; Beard, M. C.; Song, Q.; Reese, M. O.; Ellingson, R. J.; Nozik, A. J. *Nano Lett.* 2008, 8, 3488.

[103] Plass, R.; Pelet, S.; Krueger, J.; Grätzel, M.; Bach, U. *J. Phys. Chem. B* 2002, 106, 7578.

All of the foregoing references are incorporated herein by reference.

Other embodiments of the present invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method of preparing a lead chalcogenide/$TiO_2$ nanocomposite colloid, the method comprising the steps of:
   (A) injecting lead and chalcogenide precursors into a mixture of
      (i) organically passivated $TiO_2$ nanoparticles; and
      (ii) at least two surfactants capable of promoting the formation of lead chalcogenide nanocrystals directly onto the surface of said organically passivated $TiO_2$ nanoparticles, and
   (B) forming lead chalcogenide nanocrystals on the surface of said organically passivated $TiO_2$ nanoparticles.

2. The method according to claim 1, wherein said lead chalcogenide nanocrystals formed are selected from the group consisting of PbS, PbSe, PbTe, $PbS_xSe_{1-x}$, and mixtures and alloys thereof.

3. The method according to claim 1, wherein said $TiO_2$ nanoparticles have at least one shape selected from the group consisting of nanorods, tetrapods, and spheres, and mixtures thereof.

4. The method according to claim 1, wherein said $TiO_2$ nanoparticles have at least one shape selected from the group consisting of nanorods, tetrapods, spheres, and mixtures thereof, and wherein the smallest dimension of the $TiO_2$ nanoparticles is in the range of 2 nm to 10 nm, and wherein the largest dimension of the $TiO_2$ nanoparticles is in the range of 5 nm to 100 nm.

5. The method according to claim 1, wherein said surfactants are selected from the group consisting of acids, amines, alkanes, and mixtures thereof.

6. A method of preparing a lead chalcogenide/$TiO_2$ nanocomposite colloid with lead chalcogenide nanocrystals of a desired shape, the method comprising the steps of:
   (a) determining the desired shape of lead chalcogenide nanocrystals to be prepared; and
   (b) injecting lead and chalcogenide precursors into a mixture of organically passivated $TiO_2$ nanoparticles; and at least two surfactants capable of promoting the formation of lead chalcogenide nanocrystals directly onto the surface of said organically passivated TiO$_2$ nanoparticles, said at least two surfactants being present in a ratio selected to cause said lead chalcogenide nanocrystals to be formed in said desired shape; and (c) forming lead chalcogenide nanocrystals on the surface of said organically passivated TiO$_2$.

\* \* \* \* \*